US012334045B2

(12) United States Patent
Shinkai et al.

(10) Patent No.: US 12,334,045 B2
(45) Date of Patent: Jun. 17, 2025

(54) ACOUSTIC REPRODUCTION APPARATUS, SIGNAL PROCESSING APPARATUS, AND SIGNAL PROCESSING METHOD

(71) Applicant: SONY GROUP CORPORATION, Tokyo (JP)

(72) Inventors: Shogo Shinkai, Tokyo (JP); Hayami Tobise, Tokyo (JP); Shun Katsuyama, Tokyo (JP); Mahendra Kodavati, Tokyo (JP); Takuma Fukunaga, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 128 days.

(21) Appl. No.: 17/906,335

(22) PCT Filed: Feb. 16, 2021

(86) PCT No.: PCT/JP2021/005732
§ 371 (c)(1),
(2) Date: Sep. 14, 2022

(87) PCT Pub. No.: WO2021/199742
PCT Pub. Date: Oct. 7, 2021

(65) Prior Publication Data
US 2023/0223000 A1 Jul. 13, 2023

(30) Foreign Application Priority Data
Mar. 31, 2020 (JP) ................................ 2020-063187

(51) Int. Cl.
*G10K 11/178* (2006.01)

(52) U.S. Cl.
CPC .. *G10K 11/17823* (2018.01); *G10K 11/17825* (2018.01); *G10K 11/17857* (2018.01);
(Continued)

(58) Field of Classification Search
CPC ........... H04R 2410/01; H04R 2410/05; G10K 11/17857; G10K 2210/1081; G10K 2210/3026; G10K 2210/3027
See application file for complete search history.

(56) References Cited

U.S. PATENT DOCUMENTS 7,466,838 B1 12/2008 Moseley
8,447,045 B1 5/2013 Laroche
(Continued)

FOREIGN PATENT DOCUMENTS

JP 2004163875 A 6/2004
JP 2008-116782 A 5/2008
(Continued)

OTHER PUBLICATIONS

International Search Report and Written Opinion of PCT Application No. PCT/JP2021/005732, issued on May 11, 2021, 12 pages of ISRWO.

*Primary Examiner* — Ping Lee
(74) *Attorney, Agent, or Firm* — CHIP LAW GROUP

(57) ABSTRACT

Provided is an acoustic reproduction apparatus, including a first microphone to be used for noise cancellation processing using a feedback scheme, a second microphone including a sound collection surface in a direction different from a direction of a sound collection surface of the first microphone and to be used for noise cancellation processing using the feedback scheme, and an acoustic signal processing unit configured to generate a noise-cancelling signal using a first sound collection signal collected by the first microphone and a second sound collection signal collected by the second microphone.

16 Claims, 16 Drawing Sheets

(52) U.S. Cl.
CPC .. *G10K 11/17875* (2018.01); *G10K 11/17881* (2018.01); *G10K 2210/1081* (2013.01); *G10K 2210/3026* (2013.01); *G10K 2210/3027* (2013.01); *G10K 2210/3219* (2013.01); *H04R 2410/01* (2013.01); *H04R 2410/05* (2013.01)

(56) References Cited

U.S. PATENT DOCUMENTS

| | | | |
|---|---|---|---|
| 2005/0249355 | A1 | 11/2005 | Chen |
| 2015/0154950 | A1 | 6/2015 | Ring |
| 2016/0293156 | A1 | 10/2016 | Yant et al. |
| 2016/0372104 | A1 | 12/2016 | Nystrom |
| 2018/0098146 | A1 | 4/2018 | Lin |
| 2018/0255394 | A1 | 9/2018 | Colich |

FOREIGN PATENT DOCUMENTS

| | | | |
|---|---|---|---|
| JP | 2008-122729 | A | 5/2008 |
| JP | 2008-250270 | A | 10/2008 |
| JP | 2018512794 | A | 5/2018 |
| JP | 2019506021 | A | 2/2019 |
| WO | WO-2015084652 | A1 | 6/2015 |
| WO | WO-2016148955 | A2 | 9/2016 |
| WO | WO-2017122091 | A1 | 7/2017 |
| WO | WO-2017147545 | A1 | 8/2017 |
| WO | 2019/053994 | A1 | 3/2019 |

ACOUSTIC REPRODUCTION APPARATUS, SIGNAL PROCESSING APPARATUS, AND SIGNAL PROCESSING METHOD

CROSS REFERENCE TO RELATED APPLICATIONS

This application is a U.S. National Phase of International Patent Application No. PCT/JP2021/005732 filed on Feb. 16, 2021, which claims priority benefit of Japanese Patent Application No. JP 2020-063187 filed in the Japan Patent Office on Mar. 31, 2020. Each of the above-referenced applications is hereby incorporated herein by reference in its entirety.

TECHNICAL FIELD

The present disclosure relates to an acoustic reproduction apparatus, a signal processing apparatus, and a signal processing method. In particular, the present disclosure relates to generation of a noise-cancelling signal.

BACKGROUND ART

As disclosed in the following Patent Documents 1, 2, and 3, there is known a noise cancelling system that reduces noise in an external environment in a headphone or an earphone to be used for a portable audio player, or the like, and provides a listener with a favorable reproduction sound field space with reduced external noise.

CITATION LIST

Patent Document

Patent Document 1: Japanese Patent Application Laid-Open No. 2008-122729
Patent Document 2: Japanese Patent Application Laid-Open No. 2008-116782
Patent Document 3: Japanese Patent Application Laid-Open No.

SUMMARY OF THE INVENTION

Problems to be Solved by the Invention

An example of this type of noise cancelling system is an active noise reduction system that performs active noise reduction and basically has the following configuration.

In other words, external noise (noise) is collected by a microphone as acoustic-electric conversion means, and a noise-cancelling signal acoustically opposite in phase to the noise is generated from an acoustic signal of the collected noise. The noise-cancelling signal is synthesized with an acoustic signal which is an original listening target such as music and sound is acoustically reproduced by a speaker. As a result, the external noise is acoustically cancelled, so that the noise is reduced.

In such a noise reduction system, it is considered that noise cancellation performance can be improved by collecting sound using a plurality of microphones and generating a noise-cancelling signal through appropriate filter processing.

In the present disclosure, more appropriate microphone arrangement is proposed assuming that a plurality of microphones is used as described above.

Solutions to Problems

An acoustic reproduction apparatus according to the present disclosure includes a first microphone to be used for noise cancellation processing using a feedback scheme, a second microphone including a sound collection surface in a direction different from a direction of a sound collection surface of the first microphone and to be used for noise cancellation processing using the feedback scheme, and an acoustic signal processing unit configured to generate a noise-cancelling signal using a first sound collection signal collected by the first microphone and a second sound collection signal collected by the second microphone.

In a configuration including a plurality of microphones to be used for the noise cancellation processing using the feedback scheme, it is easy to collect sound in a plurality of acoustic spaces in the acoustic reproduction apparatus.

In the acoustic reproduction apparatus described above, the sound collection surface of the first microphone may be positioned closer to a driver unit configured to perform acoustic output on the basis of the noise-cancelling signal than the sound collection surface of the second microphone.

This makes the transfer function of the space from the driver unit to the sound collection surface of the first microphone to be less likely to change.

In the acoustic reproduction apparatus described above, the sound collection surface of the first microphone may be positioned to face a sound emission direction of a driver unit configured to perform acoustic output on the basis of the noise-cancelling signal.

This makes the transfer function of the space from the driver unit to the sound collection surface of the first microphone to be less likely to change.

The acoustic reproduction apparatus described above may further include a housing in which a driver unit configured to perform acoustic output on the basis of the noise-cancelling signal is disposed and which has a sound emission port through which output sound from the driver unit is emitted, and the first microphone and the second microphone may be disposed in the housing, and the second microphone may be positioned closer to the sound emission port than the first microphone.

As a result, the second microphone can collect sound at a position closer to an eardrum of an ear than the first microphone.

In the acoustic reproduction apparatus described above, the sound collection surface of the second microphone may be positioned so as not to face a sound emission direction of a driver unit configured to perform acoustic output on the basis of the noise-cancelling signal.

This makes it easier for the second microphone to collect noise.

In the acoustic reproduction apparatus described above, at least one acoustic space may be positioned in the housing in a sound emission direction of the driver unit, and the first microphone and the second microphone may be positioned in the one acoustic space.

As a result, a noise component in the acoustic space in which the microphone is disposed can be collected with high accuracy.

In the acoustic reproduction apparatus described above, the first microphone may be positioned so that the sound collection surface faces a sound emission direction of the driver unit, and the second microphone may be positioned so that the sound collection surface faces the same direction as the sound emission direction of the driver unit.

As a result, the transfer function of the space from the driver unit to the sound collection surface of the first microphone is less likely to change. In addition, the second microphone easily collects noise at a position closer to the eardrum.

In the acoustic reproduction apparatus described above, the first microphone and the second microphone may be disposed in different acoustic spaces.

This makes noise collected by the first microphone different from noise collected by the second microphone.

In the acoustic reproduction apparatus described above, a plurality of acoustic spaces may be provided in the housing, and the first microphone and the second microphone may be positioned in different spaces in the plurality of acoustic spaces.

This makes noise collected by the first microphone further different from noise collected by the second microphone.

In the acoustic reproduction apparatus described above, an acoustic resistance member that separates a first acoustic space in which the first microphone is positioned from a second acoustic space in which the second microphone is positioned, may be disposed.

This can achieve a stable space in which the transfer function of the space from the driver unit to the microphone is less likely to change for one acoustic space.

The acoustic reproduction apparatus described above may further include a housing in which a driver unit configured to perform acoustic output on the basis of the noise-cancelling signal is disposed and which has a sound emission port through which output sound from the driver unit is emitted, and the first acoustic space may be a space surrounded by the driver unit, the acoustic resistance member, and the housing, and the second acoustic space may be a space surrounded by the acoustic resistance member, the housing, and the sound emission port.

As a result, the first acoustic space becomes a stable space in which the transfer function of the space is less likely to change. In addition, the second acoustic space becomes a space in which noise at a position closer to the eardrum is easily collected.

In the acoustic reproduction apparatus described above, the first microphone may be positioned on a front side which is a sound emission direction of a driver unit that performs acoustic output on the basis of the noise-cancelling signal, and the second microphone may be positioned on a rear side of the driver unit.

As a result, the second microphone positioned behind the driver unit can collect sound in phase opposite to phase of the acoustic output. Furthermore, in the second microphone, the transfer function of the space from the driver unit to the sound collection surface of the second microphone is made less likely to change depending on a wearing state of the listener.

The acoustic reproduction apparatus described above may further include a first feedback filter configured to generate a first noise-cancelling signal on the basis of a high-frequency component of the first sound collection signal, and a second feedback filter configured to generate a second noise-cancelling signal on the basis of a low-frequency component of the second sound collection signal, and the acoustic signal processing unit may generate the noise-cancelling signal on the basis of the first noise-cancelling signal and the second noise-cancelling signal.

The first microphone is disposed closer to the driver unit than the second microphone, and thus, the filter coefficient set for the first FB filter is less likely to be inappropriate than the filter coefficient set for the second FB filter. This can make the noise-cancelling signal based on the first sound collection signal less likely to cause howling than the noise-cancelling signal based on the second sound collection signal.

In the acoustic reproduction apparatus described above, a high-frequency component of the first sound collection signal may be extracted by a high-pass filter, a high-shelving filter, or a high-peak EQ filter, and a low-frequency component of the second sound collection signal may be extracted by a low-pass filter, a low-shelving filter, or a low-peak EQ filter.

As a result, it is possible to input a sound collection signal of a high-frequency component that is more likely to howl to a feedback loop of the first microphone in which the transfer function of the space from the driver unit to the microphone is less likely to change. In addition, it is possible to input a sound collection signal of a low-frequency component to a feedback loop of the second microphone that easily collects noise at a position closer to the eardrum.

The acoustic reproduction apparatus described above may further include a third microphone to be used for noise cancellation processing using a feedforward scheme, and the acoustic signal processing unit may generate the noise-cancelling signal by using the first sound collection signal, the second sound collection signal, and a third sound collection signal collected by the third microphone.

For example, it is conceivable to provide a third microphone so as to collect sound outside the acoustic reproduction apparatus.

A signal processing apparatus according to the present disclosure includes an acoustic signal processing unit configured to generate a noise-cancelling signal using a first sound collection signal collected by a first microphone to be used for noise cancellation processing using a feedback scheme and a second sound collection signal collected by a second microphone including a sound collection surface in a direction different from a direction of a sound collection surface of the first microphone and to be used for noise cancellation processing using the feedback scheme.

A signal processing method according to the present disclosure includes generating a noise-cancelling signal using a first sound collection signal collected by a first microphone to be used for noise cancellation processing using a feedback scheme and a second sound collection signal collected by a second microphone including a sound collection surface in a direction different from a direction of a sound collection surface of the first microphone and to be used for noise cancellation processing using the feedback scheme.

According to the signal processing apparatus and signal processing method, in a configuration including a plurality of microphones to be used for the noise cancellation processing using the feedback scheme, it is easy to collect sound in a plurality of acoustic spaces in the acoustic reproduction apparatus.

MODE FOR CARRYING OUT THE INVENTION

Embodiments will be described below in the following order.

<1. Description of noise cancelling technology>
<2. First Embodiment>
<2-1. Configuration of acoustic reproduction apparatus>
<2-2. Internal configuration of acoustic reproduction apparatus>
<2-3. Acoustic reproduction apparatus as headphone>
<3. Second Embodiment>
<3-1. Acoustic reproduction apparatus as earphone>
<3-2. Acoustic reproduction apparatus as headphone>
<4. Third Embodiment>
<4-1. Acoustic reproduction apparatus as earphone>
<4-2. Acoustic reproduction apparatus as headphone>
<5. Fourth Embodiment>
<5-1. Configuration of acoustic reproduction apparatus>
<5-2. Internal configuration of acoustic reproduction apparatus>
<6. Modifications>
<6-1. First modification>
<6-2. Second modification>
<6-3. Others>
<7. Conclusion>
<8. Present technology>

Note that the acoustic reproduction apparatus described in the embodiments and defined in claims refers to an apparatus that is worn on the ear by a listener to listen and includes not only a headset type (headphone) worn on the head but also a type called "earphone" that is worn on the auricle or the ear hole.

1. Description of Noise Cancelling Technology

Figure 1:
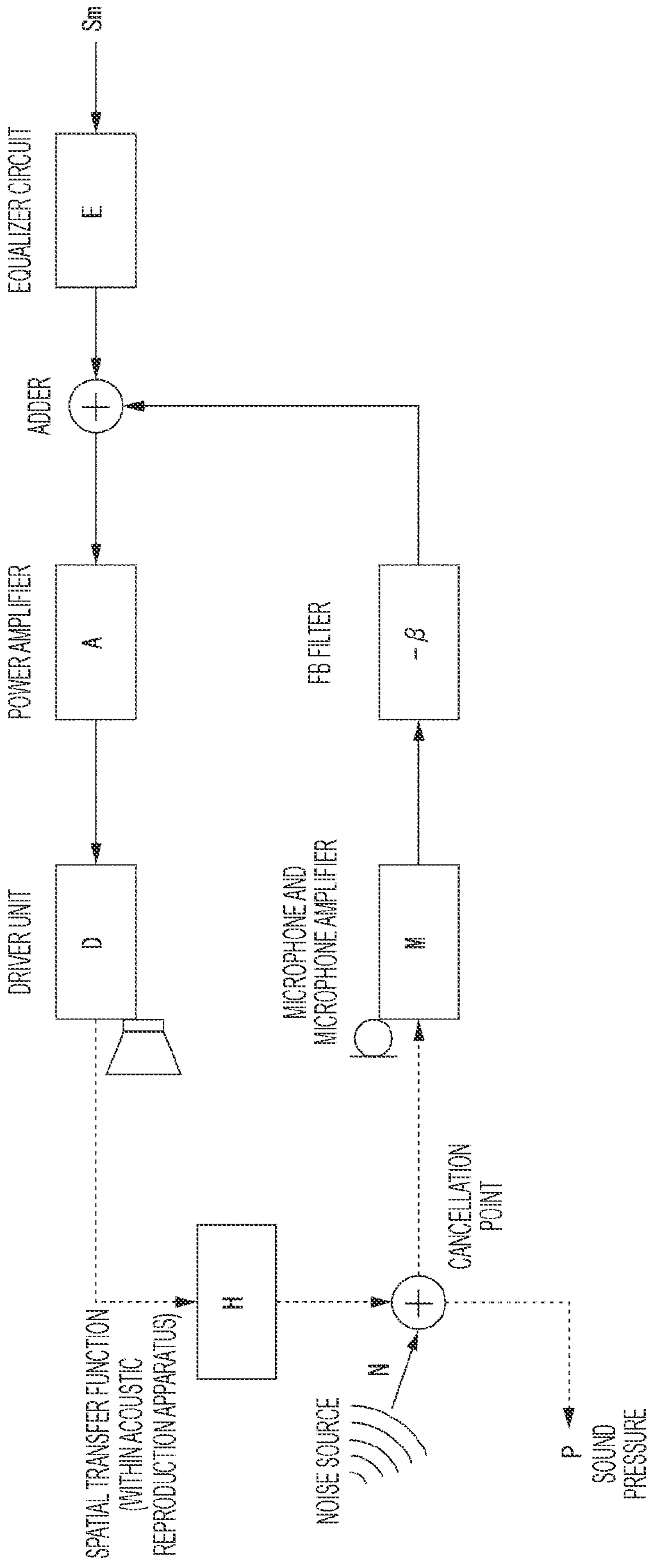
FIG. 1 is a block diagram illustrating a configuration example of an acoustic reproduction apparatus to which a noise cancelling system using a feedback scheme is applied from the viewpoint of a transfer function.

A noise cancelling technology using a feedback scheme will be described. FIG. 1 is a block diagram illustrating a configuration example of an acoustic reproduction apparatus to which a noise cancelling system using a feedback scheme is applied from the viewpoint of a transfer function.

Note that FIG. 1 illustrates only a configuration of a portion on one ear side of the listener of the acoustic reproduction apparatus. The configuration of the acoustic reproduction apparatus for each of the left and right ears is similar to that in FIG. 1.

The acoustic reproduction apparatus is provided with a driver unit as electric-acoustic conversion means for reproducing an acoustic signal that is an electric signal.

Then, a sound source signal Sm, which is a signal of music, or the like, to be reproduced by the listener, is supplied to a power amplifier as an output acoustic signal through an equalizer and an adder. The acoustic signal that has passed through the power amplifier is supplied to the driver unit and acoustically reproduced, and the reproduced sound is emitted to the ear of the listener.

An equalizer, an adder, a power amplifier, a microphone, a microphone amplifier, and a feedback (FB) filter for noise cancellation are provided in a signal transmission path between an input terminal to which the sound source signal Sm is input and the driver units for the left and right ears.

In such a configuration, in an acoustic listening environment of the listener, noise N entering an acoustic listening position of the listener in the acoustic reproduction apparatus among noise outside the acoustic reproduction apparatus is reduced using the feedback scheme, and music can be listened in a favorable environment.

In the noise cancelling system using the feedback scheme, noise at an acoustic synthesis position (noise cancellation point Pc) where noise and acoustically reproduced sound of an acoustic signal are synthesized and where the listener listens to the sound, is collected.

Thus, the microphone for noise collection is provided at a position where the noise at the noise cancellation point Pc inside a housing of the acoustic reproduction apparatus can be collected. The sound at a position of the microphone is a control point, and thus, in consideration of a noise attenuation effect, the noise cancellation point Pc is usually set at a position close to the ear, that is, a front surface of the diaphragm of the driver unit, and the microphone is provided at this position.

Then, a component in phase opposite to the phase of the noise collected by the microphone is generated as a noise-cancelling signal by the FB filter, and the generated noise-cancelling signal is supplied to the driver unit and acoustically reproduced, thereby reducing noise entering the housing of the acoustic reproduction apparatus from outside.

The analog acoustic signal collected by the microphone is converted into a digital acoustic signal by an analog-to-digital converter (ADC) through the microphone amplifier. Then, the digital acoustic signal is input to a digital filter (FB filter) for generating a feedback noise-cancelling signal.

The digital filter generates a noise-cancelling signal having characteristics in accordance with a filter coefficient as a parameter set to the input digital acoustic signal from the input digital acoustic signal.

The generated noise-cancelling signal is supplied to the adder.

As described above, the sound source signal Sm that the listener desires to listen to is supplied to the adder through the equalizer. The equalizer corrects sound quality of the input acoustic signal.

The output of the equalizer and the noise-cancelling signal from the FB filter are synthesized by the adder, supplied as an output acoustic signal to the driver unit through the power amplifier and acoustically reproduced.

Note that a digital-to-analog converter (DAC) that converts each signal from a digital signal to an analog signal is provided in either a preceding stage or a subsequent stage of the adder.

The reproduced sound includes an acoustic reproduction component by the noise-cancelling signal generated in the FB filter. The acoustic reproduction component by the noise-cancelling signal and the noise are acoustically synthesized, thereby the noise is reduced (canceled) at the noise cancellation point Pc.

FIG. 1 illustrates a transfer function of each unit. Specifically, "A" indicates a transfer function of the power amplifier, "D" indicates a transfer function of the driver unit, "M" indicates a transfer function corresponding to the microphone and microphone amplifier portions, and "−β" indicates a transfer function of a filter designed for feedback. Furthermore, "H" indicates a transfer function of a space from the driver unit to the microphone, and "E" indicates a transfer function of the equalizer to be applied to the sound source signal Sm for listening purpose. It is assumed that each of the above transfer functions is expressed by a complex expression.

In addition, "N" illustrated in FIG. 1 is noise that has entered the vicinity of the microphone position in the housing of the acoustic reproduction apparatus from an external noise source, and "P" is a sound pressure that reaches the ear of the listener. Note that possible causes of the external noise being transmitted into the housing of the acoustic reproduction apparatus can include, for example, a case where the external noise leaks as a sound pressure from a gap of the ear pad portion, and a case where the sound is transmitted into the housing of the acoustic reproduction apparatus as a result of the acoustic reproduction apparatus receiving the sound pressure and vibrating.

The transfer function block in FIG. 1 can be expressed by the following (expression 1).

$$P=\{1/(1+ADHM\beta)\}\cdot N+\{AHD/(1+ADHM\beta)\}\cdot ES \qquad \text{(Expression 1)}$$

In (expression 1), focusing on noise, it is found that the noise N attenuates to 1/(1+ADHMβ). However, in order for the system of (expression 1) to stably operate as a noise cancelling mechanism in a frequency band in which noise is to be reduced, the following (expression 2) needs to be satisfied.

$$|1/(1+ADHM\beta)|<1 \qquad \text{(Expression 2)}$$

A sufficient noise reduction effect can be obtained by setting a filter coefficient of the FB filter to be "β" that satisfies (expression 2) described above.

2. First Embodiment

<2-1. Configuration of Acoustic Reproduction Apparatus>

Figure 2:
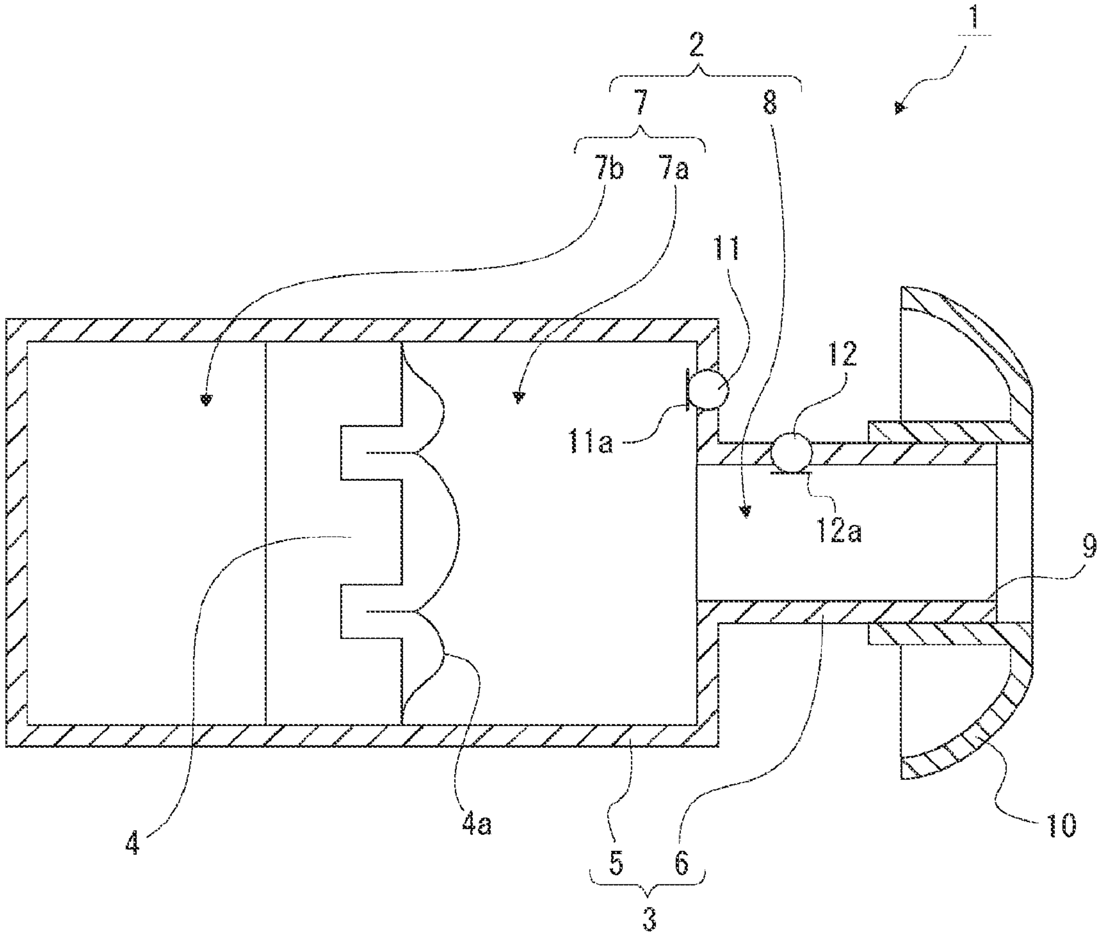
FIG. 2 is a view illustrating an earphone of a first embodiment.

A first embodiment of the acoustic reproduction apparatus 1 will be described with reference to FIG. 2. Note that FIG. 2 illustrates the acoustic reproduction apparatus 1 as an earphone as an example.

The acoustic reproduction apparatus 1 includes a housing 3 in which an internal space 2 is formed, and a driver unit 4 disposed in the internal space 2.

The driver unit 4 includes a diaphragm 4*a* to enable acoustic output.

In the following description, a sound emission direction of the driver unit 4 will be referred to as "forward".

The housing 3 includes a box-shaped portion 5 having a cylindrical shape with a front-rear direction as an axial direction and formed in a box shape opened forward, and a sound conduit 6 formed in a tubular shape extending forward from a front opening of the box-shaped portion 5.

The internal space 2 of the housing 3 includes an arrangement space 7 which is a space surrounded by the box-shaped portion 5 and in which each unit such as the driver unit 4 is disposed, and a sound guiding space 8 which is a space surrounded by the sound conduit 6.

A front opening of the sound conduit 6 is formed as a sound emission port 9 for outputting an acoustic output from the driver unit 4 to outside of the housing 3.

The driver unit 4 is disposed, for example, at a substantially central portion in the front-rear direction in the arrangement space 7. The arrangement space 7 is separated by the driver unit 4 into a front space 7*a* which is a space in front of the driver unit 4 and a rear space 7*b* which is a space behind the driver unit 4.

In the rear space 7*b*, for example, a substrate, a battery, or the like, for driving the driver unit 4 may be housed.

In the acoustic reproduction apparatus 1, an earpiece 10 detachable from the front is attached to an outer peripheral surface of the sound emission port 9 in the housing 3. The earpiece 10 is formed with an elastically deformable member such as silicon, rubber and urethane.

The acoustic reproduction apparatus 1 includes a plurality of microphones disposed in the internal space 2. FIG. 2 is an example in which the acoustic reproduction apparatus 1 includes two microphones.

Specifically, the acoustic reproduction apparatus 1 includes a first microphone 11 and a second microphone 12 to be used for noise cancellation processing using the feedback scheme.

The first microphone 11 is disposed in the front space 7*a* so that a sound collection surface 11*a* substantially faces the diaphragm 4*a* of the driver unit 4.

The second microphone 12 is disposed in the sound guiding space 8 so that a sound collection surface 12*a* faces a direction different from a direction of the sound collection surface 11*a* of the first microphone 11. Specifically, the second microphone 12 is attached so that the sound collection surface 12*a* faces a central axis of the sound conduit 6. In other words, the second microphone 12 is disposed so as not to face the diaphragm 4*a* of the driver unit 4.

In other words, the first microphone 11 is disposed at a position closer to the driver unit 4 than the second microphone 12.

In addition, the second microphone 12 is disposed at a position closer to the sound emission port than the first microphone 11.

By disposing the first microphone 11 and the second microphone 12 in different acoustic spaces, it is possible to collect sound in the front space 7*a* and the sound guiding space 8 which are different acoustic spaces. In other words, the first sound collection signal S1 of the first microphone 11 is a signal including noise in the front space 7*a*. In addition, the second sound collection signal S2 of the second microphone 12 is a signal including noise in the sound guiding space 8.

Further, the second microphone 12 can collect sound at a position closer to an eardrum of an ear than the first microphone 11.

By adopting the above configuration, feedback control using the sound collection signals collected from the first microphone 11 and the second microphone 12 is performed to generate a noise-cancelling signal.

The generated noise-cancelling signal is generated as an output signal from the driver unit 4 by being added to the sound source signal Sm, for example. The output signal generated in this manner is output from the driver unit 4, so that the listener listens to the reproduced sound with reduced noise at a predetermined cancellation point.

<2-2. Internal Configuration of Acoustic Reproduction Apparatus>

Figure 3:
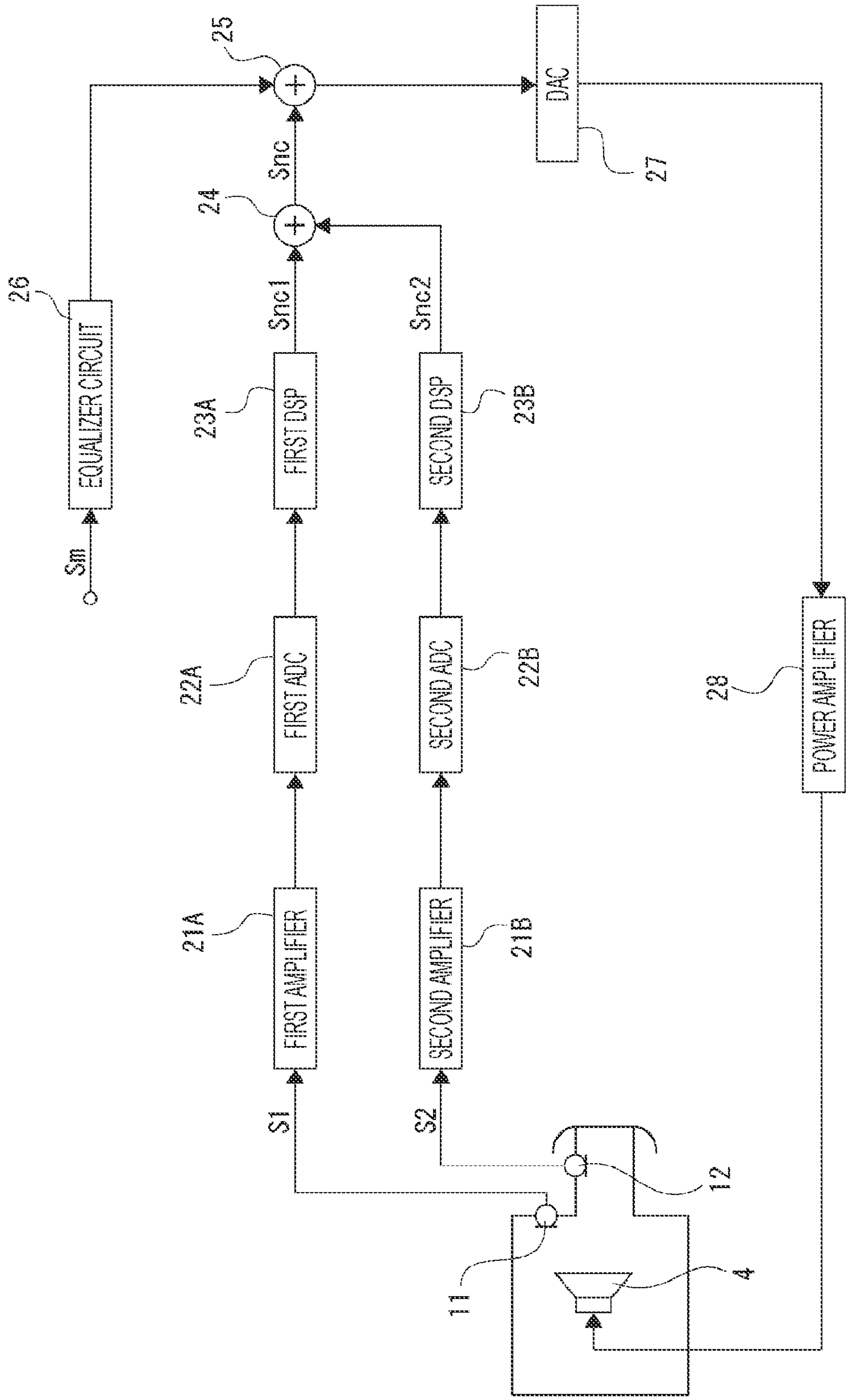
FIG. 3 is a block diagram of the acoustic reproduction apparatus according to the first embodiment.

FIG. 3 is a block diagram of an internal configuration of the acoustic reproduction apparatus 1. Note that, in FIG. 3 and subsequent drawings, only one of the left and right channels of a stereo acoustic signal is illustrated for simplification of description. By adopting a configuration similar to the configuration in FIG. 3 in the other channel, it is possible to perform noise cancellation processing for stereo sound.

Note that each component may be shared by the left and right channels.

The sound source signal Sm as a digital signal is input to the acoustic reproduction apparatus 1 from music/sound source equipment such as an audio player (not illustrated) provided outside. The sound source signal Sm is, for example, a digital signal such as music that the listener desires to listen to.

The acoustic reproduction apparatus 1 includes a first amplifier 21A, a first ADC 22A, and a first digital signal processor (DSP) 23A as units for performing processing on the first sound collection signal S1 of the first microphone 11.

Furthermore, the acoustic reproduction apparatus 1 includes a second amplifier 21B, a second ADC 22B, and a second DSP 23B as units for performing processing on the sound collection signal S2 of the second microphone 12.

Furthermore, the acoustic reproduction apparatus 1 includes adders 24 and 25, an equalizer circuit 26, a DAC 27, and a power amplifier 28.

As described above, the first sound collection signal S1 is obtained by collecting sound including noise in the front space 7*a* of the diaphragm 4*a* of the driver unit 4.

The first sound collection signal S1 is amplified by the first amplifier 21A, converted into a digital signal by the first ADC 22A and input to the first DSP 23A.

The first DSP 23A includes a digital filter for generating a feedback noise-cancelling signal.

Figure 4:
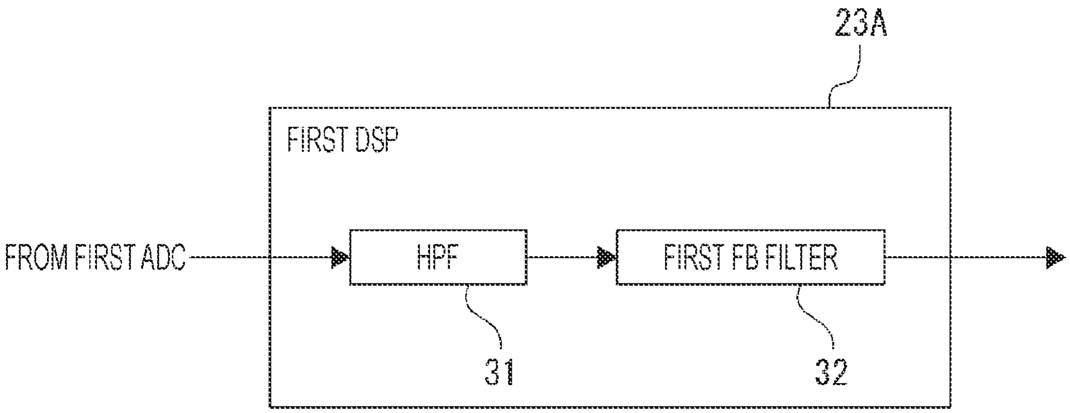
FIG. 4 is a block diagram of a first DSP of the first embodiment.

FIG. 4 is a view illustrating a configuration example of the first DSP 23A. As illustrated, the first DSP 23A includes a high-pass filter (HPF) 31 and a first FB filter 32.

The HPF 31 is a digital filter that removes a low-frequency component from the input digital signal from the first ADC 22A.

The first FB filter 32 is a digital filter for generating a feedback digital noise-cancelling signal.

In other words, the first FB filter 32 generates a first noise-cancelling signal Snc1 on the basis of a high-frequency component in the first sound collection signal S1.

The signal generated by the first DSP 23A is input to the adder 24.

As described above, the second sound collection signal S2 is obtained by collecting sound including noise of the sound guiding space 8 which is the internal space of the sound conduit 6.

The second sound collection signal S2 is amplified by the second amplifier 21B, converted into a digital signal by the second ADC 22B and input to the second DSP 23B.

The second DSP 23B includes a digital filter for generating a feedback noise-cancelling signal.

Figure 5:
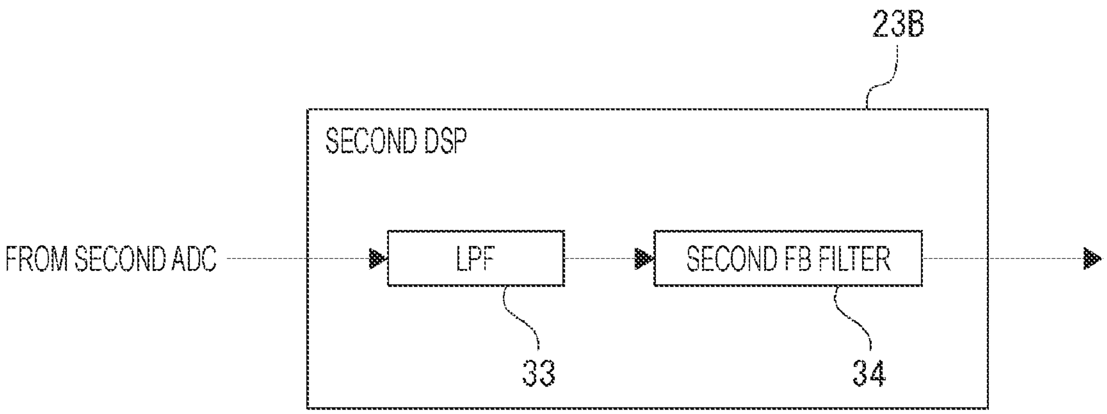
FIG. 5 is a block diagram of a second DSP of the first embodiment.

FIG. 5 is a view illustrating a configuration example of the second DSP 23B. As illustrated, the second DSP 23B includes a low-pass filter (LPF) 33 and a second FB filter 34.

The LPF 33 is a digital filter that removes a high-frequency component from the input digital signal from the second ADC 22B.

The second FB filter 34 is a digital filter for generating a feedback digital noise-cancelling signal.

In other words, the second FB filter 34 generates a second noise-cancelling signal Snc2 on the basis of a low-frequency component in the second sound collection signal S2.

The signal generated by the second DSP 23B is input to the adder 24.

The adder 24 adds and synthesizes the first noise-cancelling signal Snc1 generated on the basis of the first sound collection signal S1 of the first microphone 11 and the second noise-cancelling signal Snc2 generated on the basis of the second sound collection signal S2 of the second microphone 12 and outputs the result as a synthesized noise-cancelling signal Snc to the adder 25.

In addition to the synthesized noise-cancelling signal Snc, a digital signal based on the sound source signal Sm is also input to the adder 25.

The sound source signal Sm is input to the equalizer circuit 26.

The equalizer circuit 26 performs equalizing processing for sound quality correction processing and sound quality effect processing on the input sound source signal Sm and outputs the obtained digital signal to the adder 25.

The equalizer circuit 26 may be constituted within a DSP, for example.

The adder 25 adds and synthesizes the synthesized noise-cancelling signal Snc and the signal from the equalizer circuit 26 and outputs the result to the DAC 27 as an output acoustic signal.

The output signal from the adder 25 is converted into an analog signal by the DAC 27, then amplified by the power amplifier 28 and supplied to the driver unit 4.

In the driver unit 4, acoustic output processing based on the input output acoustic signal is executed. As a result, the listener listens to the reproduced sound with reduced noise at a predetermined noise cancellation point.

As illustrated in FIG. 2, the first microphone 11 is disposed so that the sound collection surface 11*a* faces the diaphragm 4*a* of the driver unit 4. With such arrangement of the first microphone 11, the transfer function of the space from the driver unit 4 to the first microphone 11 is less likely to change.

If the transfer function of the space does not change, it is possible to generate a noise-cancelling signal having sufficient noise cancellation performance with the set filter coefficient in the set first FB filter 32.

In other words, the first noise-cancelling signal Snc1 generated using the first sound collection signal S1 can sufficiently exhibit the noise cancellation performance.

Note that as illustrated in FIG. 2, the second microphone 12 is provided in the sound guiding space 8, and the transfer function of the space from the driver unit 4 to the second microphone 12 can change.

If the transfer function of the space changes, the filter coefficient set in the second FB filter 34 may not be appropriate, in which case, howling may occur.

Generally, occurrence of howling is often caused by a high-frequency component of equal to or higher than 1 kHz.

Thus, for the high-frequency component, the first noise-cancelling signal Snc1 generated using the first microphone 11 in which the transfer function of the space is less likely to change is used.

This makes it possible to prevent occurrence of howling caused by the high-frequency component.

Furthermore, for other low-frequency components, the second noise-cancelling signal Snc2 generated using the second microphone 12 capable of collecting sound at a position closer to the eardrum of the listener is used.

This can bring the cancellation point closer to the eardrum.

For example, the first noise-cancelling signal Snc1 is generated on the basis of the high-frequency component of the first sound collection signal S1 extracted by the HPF 31 whose cutoff frequency is 200 Hz.

Furthermore, the second noise-cancelling signal Snc2 is generated on the basis of the low-frequency component of the second sound collection signal S2 extracted by the LPF 33 whose cutoff frequency is 200 Hz.

According to the above configuration, the synthesized noise-cancelling signal Snc is generated by synthesizing the first noise-cancelling signal Snc1 based on the high-frequency component of the first sound collection signal S1 and the second noise-cancelling signal Snc2 based on the low-frequency component of the second sound collection signal S2, so that it is possible to improve noise cancellation performance at the eardrum position while preventing occurrence of howling.

While FIG. 3 illustrates an example in which the first DSP 23A and the second DSP 23B are provided, a digital filter for the first sound collection signal S1 and a digital filter for the second sound collection signal S2 may be formed in one DSP.

Furthermore, in this case, the equalizer circuit 26 may be formed in the same DSP.

Note that while FIG. 3 illustrates an example in which the sound source signal Sm is a digital signal, the sound source signal Sm may be an analog signal. In this case, the sound source signal Sm is converted into a digital signal using the ADC and input to the equalizer circuit 26.

Figure 19:
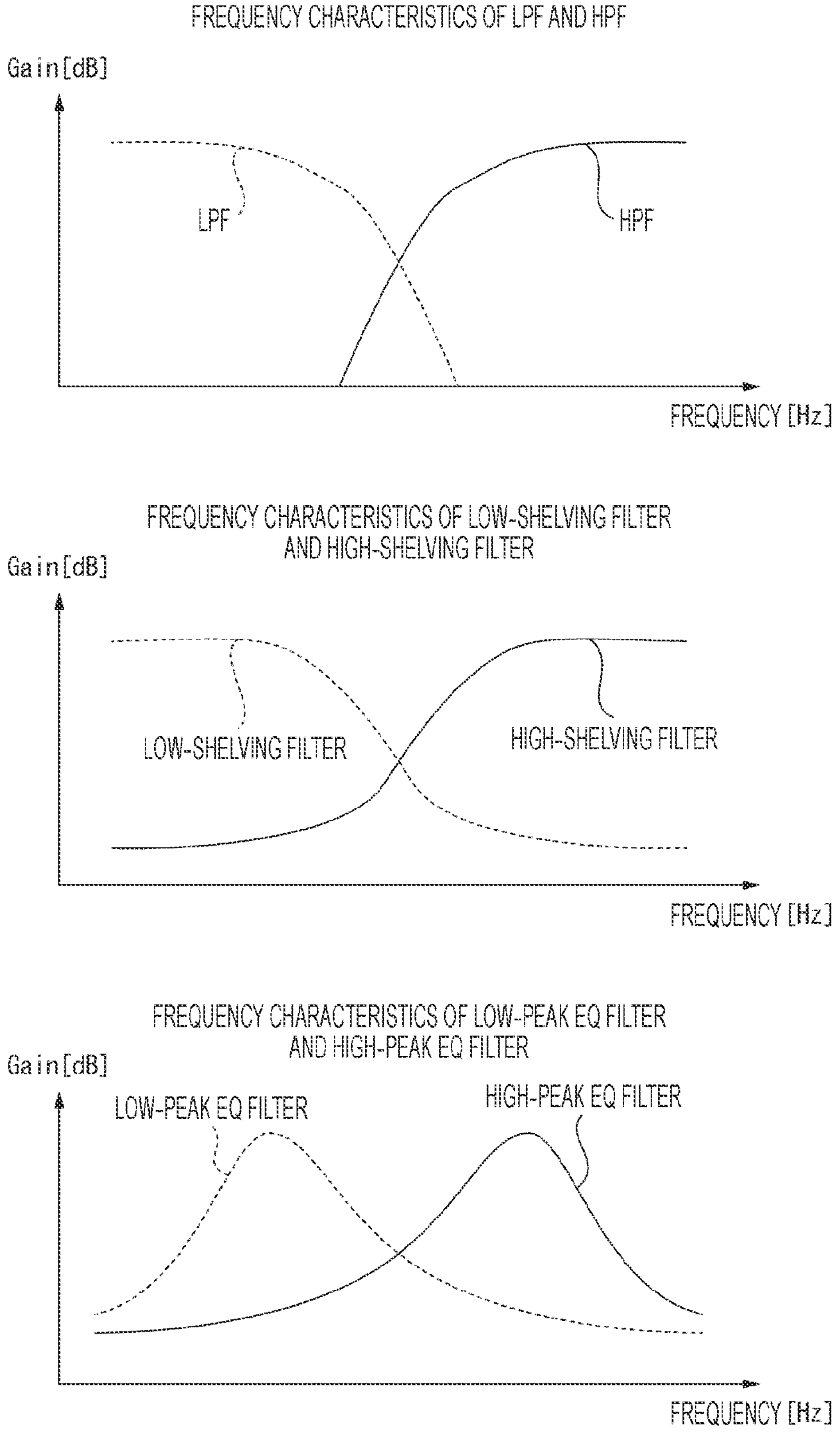
FIG. 19 is a view illustrating frequency characteristics of each filter.

The HPF 31 included in the first DSP 23A can be replaced with a high-shelving filter or a high-peak equalizer (EQ) filter (see FIG. 19).

Furthermore, the LPF 33 included in the second DSP 23B can be replaced with a low-shelving filter or a low-peak EQ filter (see FIG. 19).

Note that the internal configuration of the acoustic reproduction apparatus 1 may be other than the configurations illustrated in FIGS. 3, 4, and 5. As an example, for example, at least one of the first FB filter 32 or the second FB filter 34 may be a filter for an analog signal. In this case, the first ADC 22A and the second ADC 22B are unnecessary.

Further, instead of the first DSP 23A and the second DSP 23B, a central processing unit (CPU), a hardwired circuit that performs hardwired signal processing, or the like, may be used.

Furthermore, the first microphone 11 and the second microphone 12 may be digital microphones. In this case, the first ADC 22A and the second ADC 22B are unnecessary.

Further, the HPF 31 illustrated in FIG. 4 may be provided not at a preceding stage but at a subsequent stage of the first FB filter 32. Still further, the HPF 31 may be provided inside the first FB filter 32.

Similarly, the LPF 33 illustrated in FIG. 5 may be provided at the subsequent stage of the second FB filter 34 or may be provided inside the second FB filter 34.

The same applies to the following units.

<2-3. Acoustic Reproduction Apparatus as Headphone>

An example in which the configuration of the first embodiment described above is applied to an acoustic reproduction apparatus 1A as a headphone will be described with reference to FIG. 6.

Note that the components similar to those of the acoustic reproduction apparatus 1 as the earphone illustrated in FIG. 2 will be denoted by the same reference signs.

The acoustic reproduction apparatus 1A includes a housing 3 in which an internal space 2 is formed, and a driver unit 4 disposed in the internal space 2.

The driver unit 4 includes a diaphragm 4*a* to enable acoustic output.

The housing 3 includes a base portion 42 in which an arrangement recess 41 to which the driver unit 4 is to be attached is formed, and an ear pad 43 to be attached to a front peripheral portion of the arrangement recess 41.

A front inner peripheral edge of the ear pad 43 is formed as the sound emission port 9.

The internal space 2 includes the front space 7*a* that is a space surrounded by the ear pad 43, the front surface of the driver unit 4, and the sound emission port 9, and the rear space 7*b* that is a space surrounded by the base portion 42 and the rear surface of the driver unit 4.

The acoustic reproduction apparatus 1A includes a first microphone 11 and a second microphone 12 to be used for noise cancellation processing using the feedback scheme.

In front of the diaphragm 4*a* of the driver unit 4, for example, a protective member 44 formed in a mesh shape for protecting the diaphragm 4*a* is attached.

In the protective member 44, a first attachment portion 44*a* to which the first microphone 11 is to be attached and a second attachment portion 44*b* to which the second microphone 12 is to be attached are provided substantially at the center.

The second microphone 12 is disposed so that the sound collection surface 12*a* faces a direction different from a direction of the sound collection surface 11*a* of the first microphone 11.

For example, the first attachment portion 44*a* is made as a recess opened rearward (diaphragm direction) and laterally, and the first microphone 11 is attached so that the sound collection surface 11*a* substantially faces the diaphragm 4*a*.

Further, the second attachment portion 44*b* is made as a recess opened forward and laterally, and the second microphone 12 is attached so that the sound collection surface 12*a* faces in the same direction as the sound emission direction of the driver unit 4.

Both the first microphone 11 and the second microphone 12 are disposed in the front space 7*a*. In other words, the first microphone 11 and the second microphone 12 are disposed in the same acoustic space.

The first microphone 11 and the second microphone 12 are disposed in the same acoustic space, and the direction of the sound collection surface 11*a* of the first microphone 11 and the direction of the sound collection surface 12*a* of the second microphone 12 are different, so that it is possible to collect a noise component in the acoustic space in which the microphones are disposed with high accuracy.

It is therefore possible to improve noise cancellation performance.

The block diagram of the internal configuration of the acoustic reproduction apparatus 1A has a configuration similar to that of FIG. 3, and thus, description thereof will be omitted.

Figure 6:
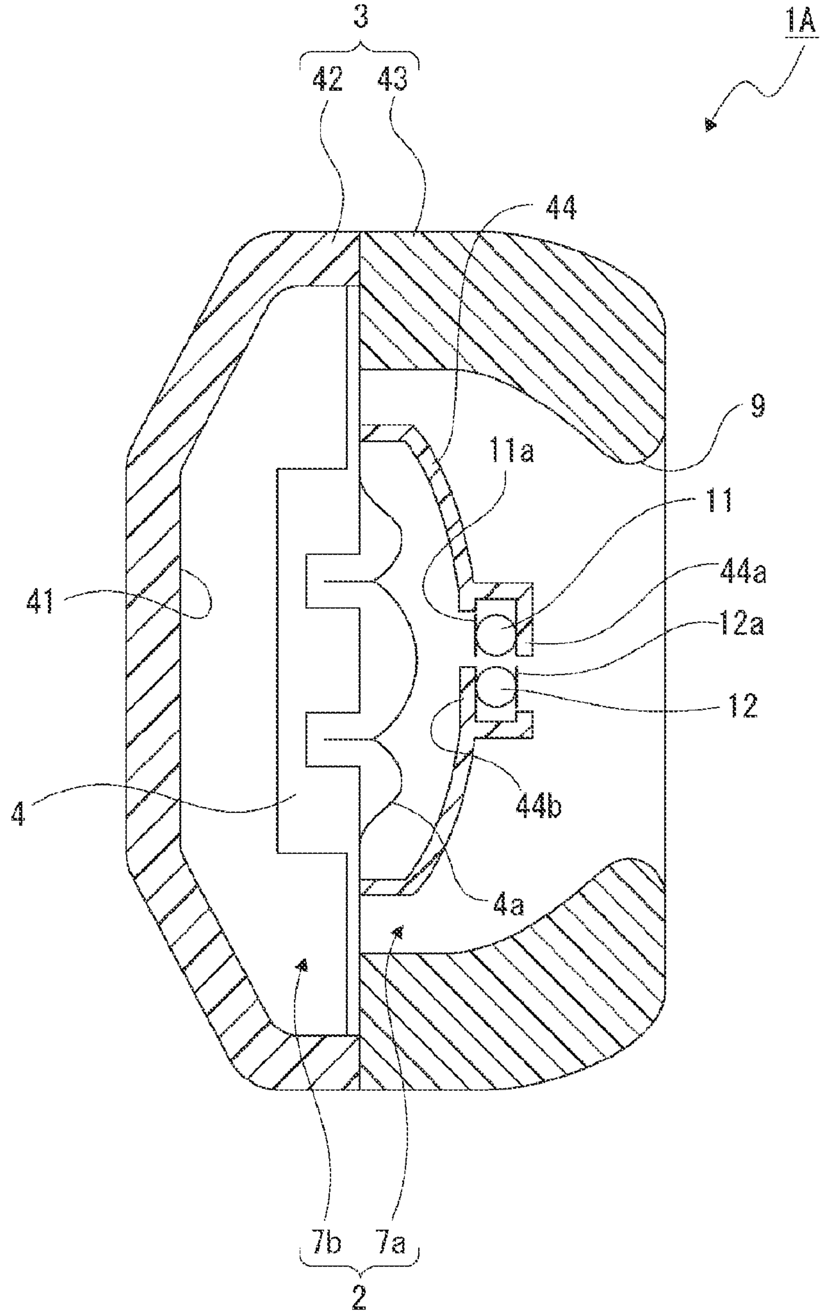
FIG. 6 is a view illustrating a headphone of the first embodiment.

As the acoustic reproduction apparatus 1A as the headphone is configured as illustrated in FIGS. 3 and 6, the synthesized noise-cancelling signal Snc is generated by synthesizing the first noise-cancelling signal Snc1 based on the high-frequency component of the first sound collection signal S1 and the second noise-cancelling signal Snc2 based on the low-frequency component of the second sound collection signal S2, so that it is possible to improve noise cancellation performance at the eardrum position while preventing occurrence of howling.

3. Second Embodiment

<3-1. Acoustic Reproduction Apparatus as Earphone>

An acoustic reproduction apparatus 1B as an earphone in a second embodiment includes an acoustic resistance member 51 for dividing the internal space 2 into a plurality of acoustic spaces.

A specific configuration will be described with reference to FIG. 7. Note that components similar to those of the acoustic reproduction apparatus 1 in the first embodiment illustrated in FIG. 2 will be denoted by the same reference signs, and description thereof will be omitted as appropriate.

The acoustic reproduction apparatus 1B includes the housing 3 in which the internal space 2 is formed, the driver unit 4 disposed in the internal space 2, the first microphone 11, and the second microphone 12.

The internal space 2 includes the arrangement space 7 in which each unit is disposed, and the sound guiding space 8 surrounded by the sound conduit 6.

The arrangement space 7 includes the front space 7*a* which is a space in front of the driver unit 4 and the rear space 7*b* which is a space behind the driver unit 4.

A front opening of the sound conduit 6 is formed as a sound emission port 9 for outputting an acoustic output from the driver unit 4 to outside of the housing 3.

The acoustic reproduction apparatus 1B includes the acoustic resistance member 51 that separates the front space 7*a* from the sound guiding space 8.

In other words, the front space 7*a* is a space surrounded by the box-shaped portion 5 of the housing 3, the driver unit 4, and the acoustic resistance member 51, thereby being an acoustically stable space. This makes a transfer function of a space from the driver unit 4 to the first microphone 11 less likely to change.

Further, the sound guiding space 8 is a space surrounded by the sound conduit 6 of the housing 3, the acoustic resistance member 51, and the sound emission port 9.

Figure 17:
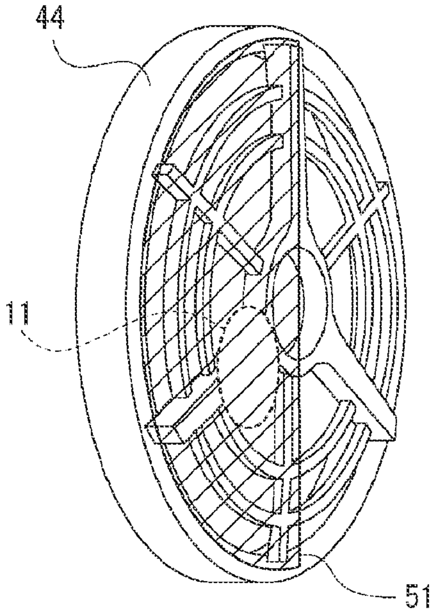
FIG. 17 is a view illustrating an example of attachment of an acoustic resistance member.
Figure 18:
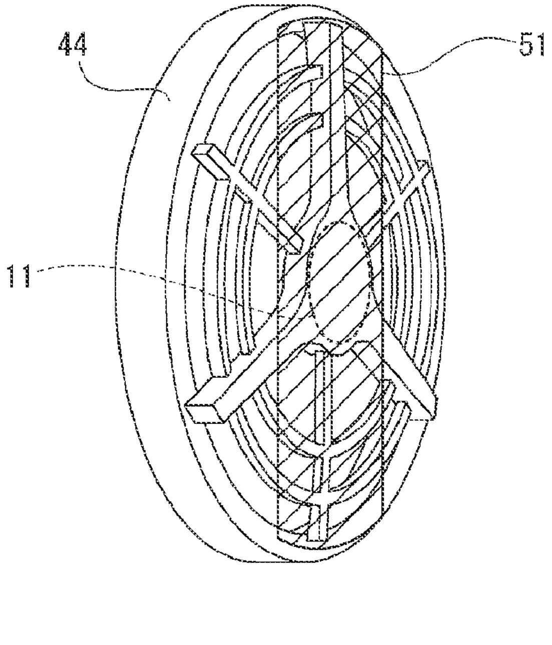
FIG. 18 is a view illustrating an example of attachment of an acoustic resistance member.

Note that division into the two acoustic spaces is not limited to a case where the space is completely divided into two spaces by the acoustic resistance member 51, and it is only required to obtain an effect similar to the case where the space is acoustically completely divided into two spaces (or an effect similar thereto). For example, a similar effect can be obtained even in a case where it can be regarded as the space being acoustically divided into two spaces by disposing the acoustic resistance member 51 in a portion between the two acoustic spaces as illustrated in FIGS. 17 and 18 as will be described later.

A block diagram of an internal configuration of the acoustic reproduction apparatus 1B has a configuration similar to that of FIG. 3.

Figure 7:
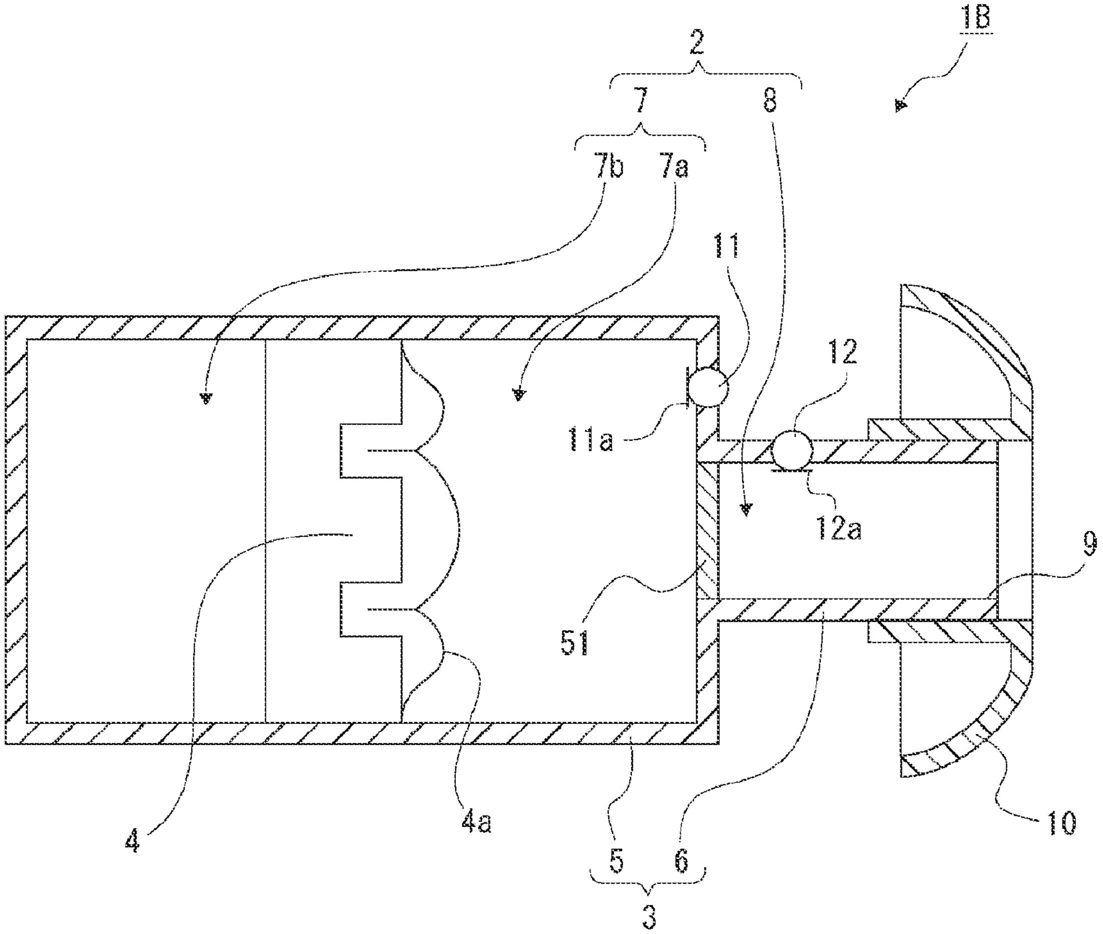
FIG. 7 is a view illustrating an earphone of a second embodiment.

By the acoustic reproduction apparatus 1B having the configuration illustrated in FIGS. 3 and 7, it is possible to improve noise cancellation performance of the first noise-cancelling signal Snc1 generated on the basis of the high-frequency component of the first sound collection signal S1, which is a signal collected in the front space 7*a* that is made the stable space, while further preventing occurrence of howling.

Furthermore, the second noise-cancelling signal Snc2 is a signal that can bring the cancellation point closer to the eardrum.

Therefore, the synthesized noise-cancelling signal Snc is generated by synthesizing the first noise-cancelling signal Snc1 based on the high-frequency component of the first sound collection signal S1 and the second noise-cancelling signal Snc2 based on the low-frequency component of the second sound collection signal S2, so that it is possible to further improve noise cancellation performance at the eardrum position while preventing occurrence of howling.

<3-2. Acoustic Reproduction Apparatus as Headphone>

Figure 8:
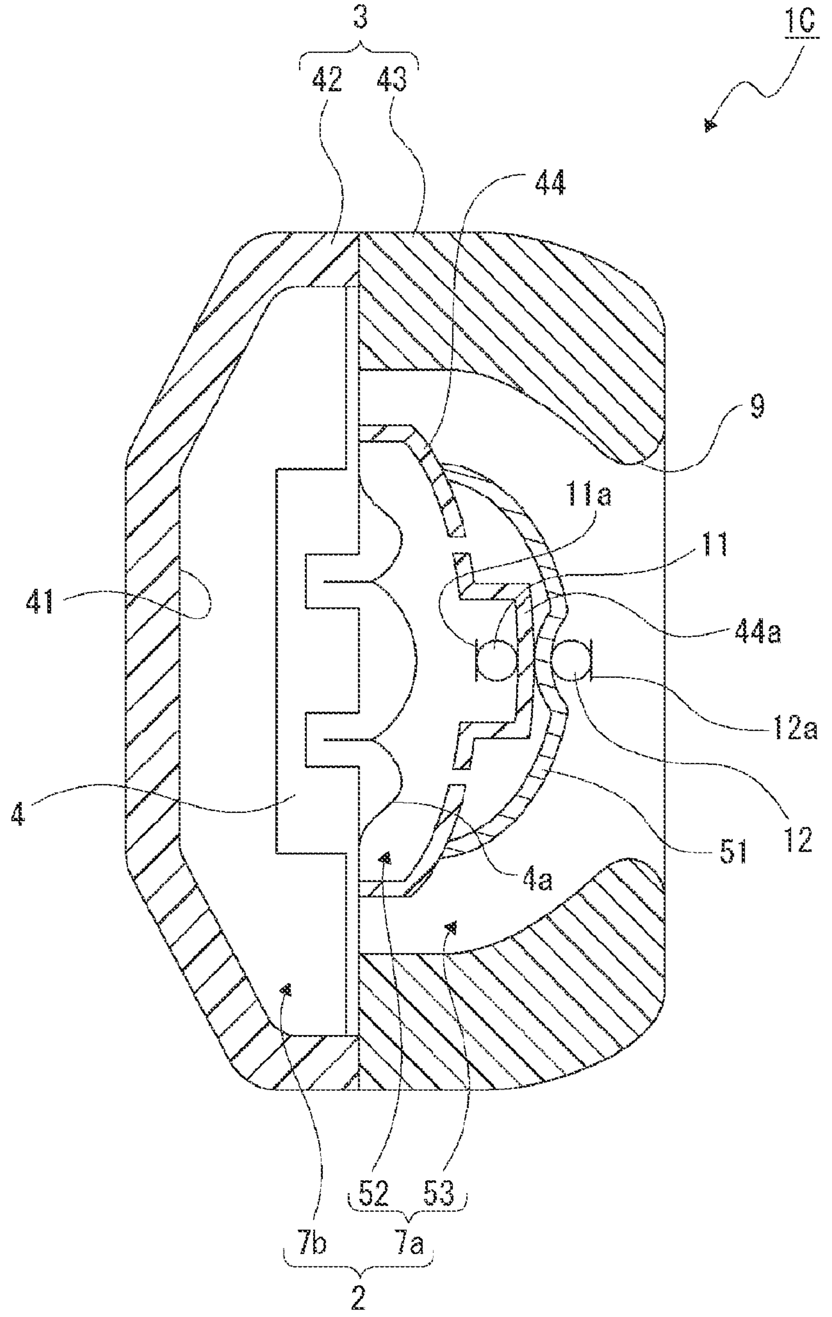
FIG. 8 is a view illustrating a headphone of the second embodiment.

FIG. 8 illustrates a configuration example of an acoustic reproduction apparatus 1C as a headphone.

Note that components similar to those of the acoustic reproduction apparatus 1 illustrated in FIG. 2, the acoustic reproduction apparatus 1A illustrated in FIG. 6, and the acoustic reproduction apparatus 1B illustrated in FIG. 7 will be denoted by the same reference signs, and description thereof will be omitted as appropriate.

The acoustic reproduction apparatus 1C includes the housing 3 in which the internal space 2 is formed, the driver unit 4 disposed in the internal space 2, and a first microphone 11 and a second microphone 12 to be used for noise cancellation processing using the feedback scheme.

The driver unit 4 includes a diaphragm 4*a* to enable acoustic output.

The housing 3 includes a base portion 42 in which an arrangement recess 41 to which the driver unit 4 is to be attached is formed, and an ear pad 43 to be attached to a front peripheral portion of the arrangement recess 41.

A front inner peripheral edge of the ear pad 43 is formed as the sound emission port 9.

In front of the diaphragm 4*a* of the driver unit 4, for example, a protective member 44 formed in a mesh shape for protecting the diaphragm 4*a* is attached.

The internal space 2 includes the front space 7*a* that is a space surrounded by the ear pad 43, the front surface of the driver unit 4, and the sound emission port 9, and the rear space 7*b* that is a space surrounded by the base portion 42 and the rear surface of the driver unit 4.

The acoustic reproduction apparatus 1C is provided with the acoustic resistance member 51 that further divides the front space 7*a* into two acoustic spaces. Specifically, the front space 7*a* is separated into an inner space 52 that is a space on the driver unit 4 side and an outer space 53 that is a space on the sound emission port 9 side by the acoustic resistance member 51. Note that the inner space 52 and the outer space 53 can also be regarded as the front space 7*a* and the sound guiding space 8 in the acoustic reproduction apparatus 1 as an earphone.

The acoustic resistance member 51 is attached to, for example, the protective member 44.

The first microphone 11 is attached to a rear surface of the protective member 44 so that the sound collection surface 11*a* substantially faces the diaphragm 4*a*.

The second microphone 12 is attached to the front surface of the acoustic resistance member 51 so that the sound collection surface 12*a* faces the sound emission port 9.

In other words, the first microphone 11 and the second microphone 12 included in the acoustic reproduction apparatus 1C are disposed in different acoustic spaces separated by the acoustic resistance member 51.

A block diagram of an internal configuration of the acoustic reproduction apparatus 1C has a configuration similar to that of FIG. 3. In other words, in the acoustic reproduction apparatus 1C, the first noise-cancelling signal Snc1 is generated on the basis of the high-frequency component of the first sound collection signal S1 of the first microphone 11.

Thus, by generating the synthesized noise-cancelling signal Snc using the first sound collection signal S1 of the first microphone 11 disposed in the inner space 52 which is an acoustically stable space, it is possible to further prevent occurrence of howling.

Furthermore, by generating the synthesized noise-cancelling signal Snc using the low-frequency component of the second sound collection signal S2, noise cancellation performance at the eardrum position can be improved.

4. Third Embodiment

<4-1. Acoustic Reproduction Apparatus as Earphone>

An acoustic reproduction apparatus 1D as an earphone in a third embodiment includes the acoustic resistance member 51 that divides the internal space 2 into a plurality of acoustic spaces, and the second microphone 12 is disposed behind the driver unit 4.

Figure 9:
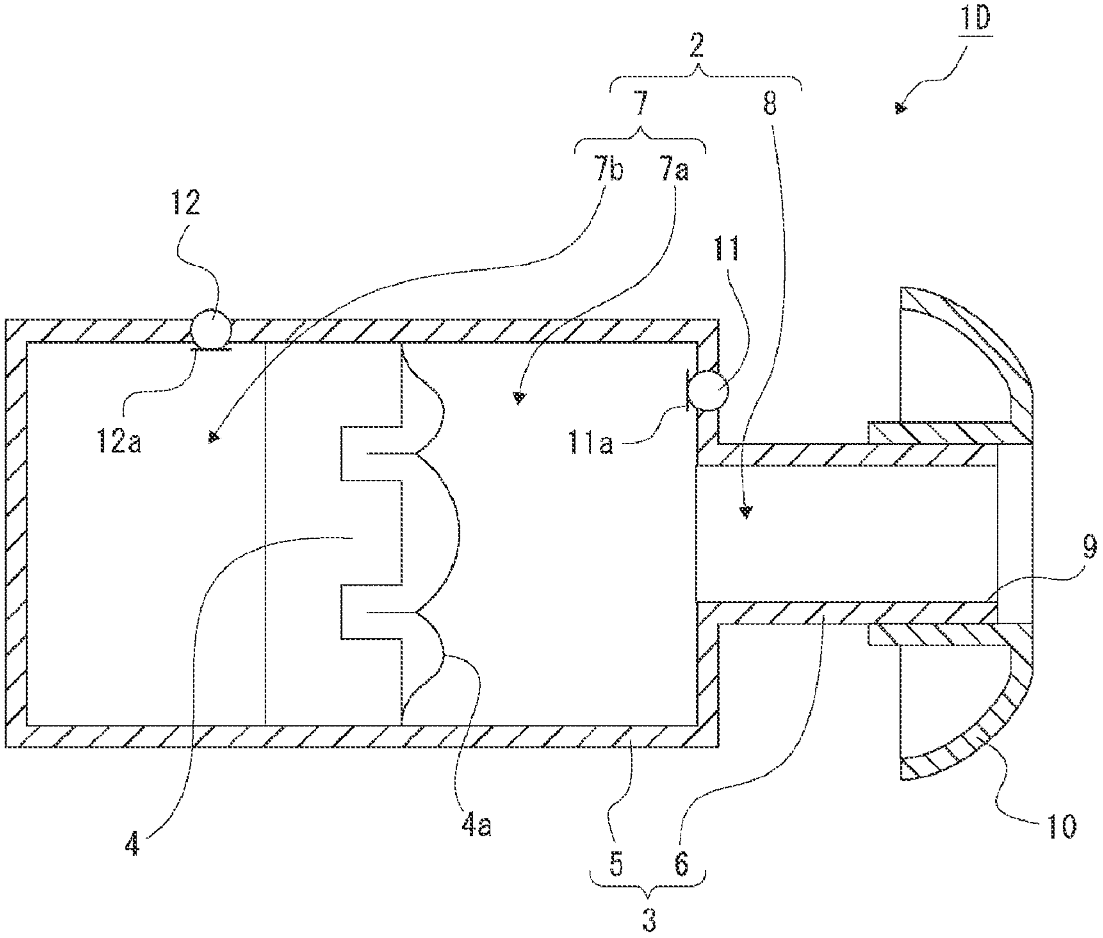
FIG. 9 is a view illustrating an earphone of a third embodiment.

This will be specifically described with reference to FIG. 9.

The acoustic reproduction apparatus 1D includes the housing 3 in which the internal space 2 is formed, the driver unit 4 disposed in the internal space 2, the first microphone 11, and the second microphone 12.

The internal space 2 includes the arrangement space 7 in which each unit is disposed, and the sound guiding space 8 surrounded by the sound conduit 6.

The arrangement space 7 includes the front space 7*a* which is a space in front of the driver unit 4 and the rear space 7*b* which is a space behind the driver unit 4.

The acoustic reproduction apparatus 1D includes the acoustic resistance member 51 that separates the front space 7*a* from the sound guiding space 8.

In other words, the front space 7*a* is a space surrounded by the box-shaped portion 5 of the housing 3, the driver unit 4, and the acoustic resistance member 51, thereby being an acoustically stable space.

The first microphone 11 is disposed so that the sound collection surface 11*a* substantially faces the diaphragm 4*a* in the front space 7*a*.

The second microphone 12 is disposed so that the sound collection surface 12*a* does not face the diaphragm 4*a* in the rear space 7*b*.

A block diagram of an internal configuration of the acoustic reproduction apparatus 1D has a configuration similar to that of FIG. 3.

In the second microphone 12 disposed in the rear space 7*b*, a sound pressure in phase opposite to phase of a sound pressure emitted forward from the diaphragm 4*a* and noise entering through the housing 3 can be collected. Furthermore, the signal collected by the second microphone 12 can be made less likely to be affected by change in a transfer function of a space from the driver unit to the microphone.

Thus, by generating the synthesized noise-cancelling signal Snc using the second sound collection signal S2 by the second microphone 12, it is possible to improve noise cancellation performance.

Note that, in the present example, an example has been described in which the first microphone 11 is disposed in the front space 7*a* and the second microphone 12 is disposed in the rear space 7*b*, but the first microphone 11 may be disposed in the rear space 7*b* and the second microphone 12 may be disposed in the sound guiding space 8.

<4-2. Acoustic Reproduction Apparatus as Headphone>

Figure 10:
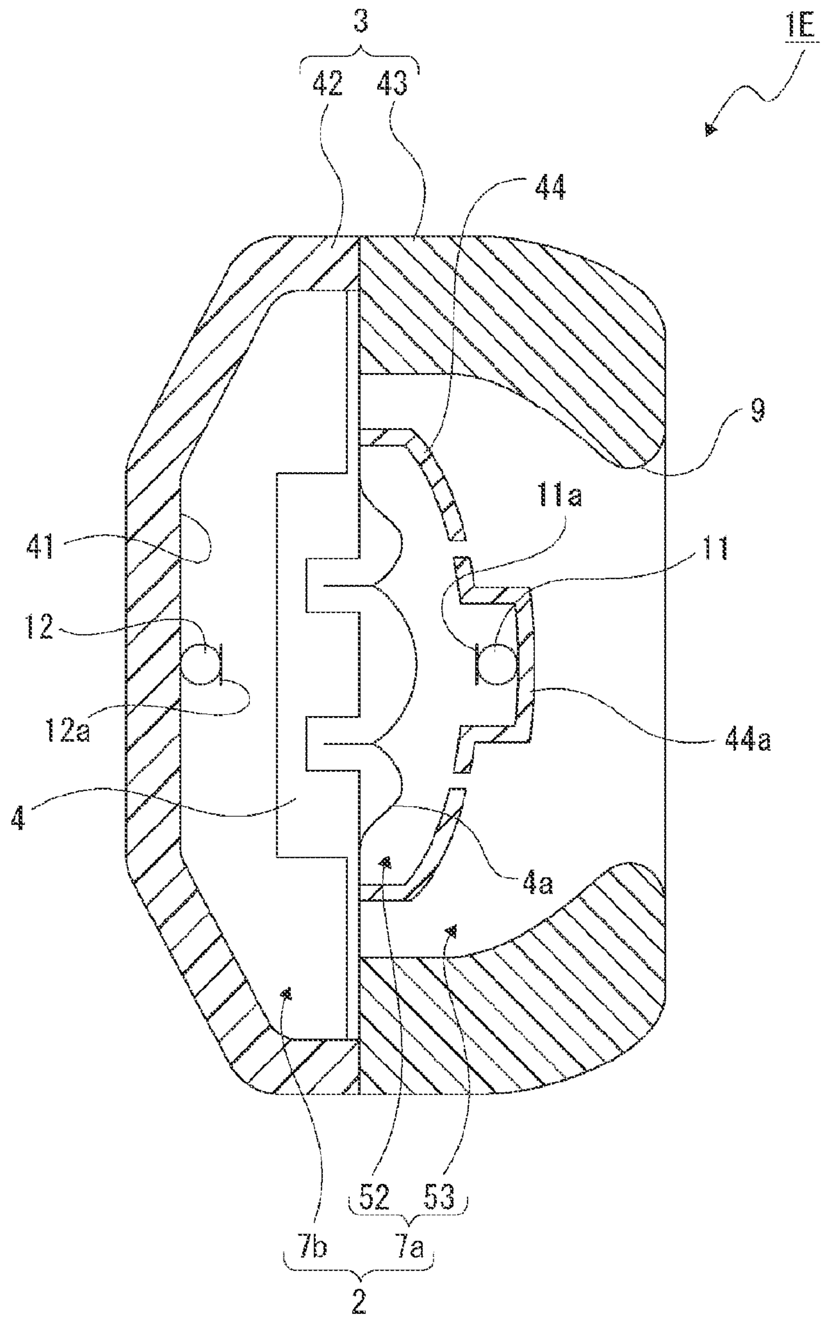
FIG. 10 is a view illustrating a headphone of the third embodiment.

An acoustic reproduction apparatus 1E as a headphone in the third embodiment will be described with reference to FIG. 10.

Note that components similar to those of the described-above various acoustic reproduction apparatuses, such as the acoustic reproduction apparatus 1 illustrated in FIG. 2, the acoustic reproduction apparatus 1A illustrated in FIG. 6, and the like, will be denoted by the same reference signs, and description thereof will be omitted as appropriate.

The acoustic reproduction apparatus 1E includes the housing 3 in which the internal space 2 is formed, the driver unit 4 disposed in the internal space 2, and a first microphone 11 and a second microphone 12 to be used for noise cancellation processing using the feedback scheme.

The driver unit 4 includes a diaphragm 4*a* to enable acoustic output.

The housing 3 includes the base portion 42 and the ear pad 43. A front inner peripheral edge of the ear pad 43 is formed as the sound emission port 9.

The protective member 44 is attached in front of the diaphragm 4*a* of the driver unit 4.

The first microphone 11 is disposed in the front space 7*a*. Specifically, the first microphone 11 is attached to a rear surface of the protective member 44 so that the sound collection surface 11*a* substantially faces the diaphragm 4*a*.

The second microphone 12 is disposed in the rear space 7*b*. Specifically, the second microphone 12 is attached to the housing 3 so that the sound collection surface 12*a* faces a direction different from a direction of the sound collection surface 11*a* of the first microphone 11.

In other words, the first microphone 11 and the second microphone 12 included in the acoustic reproduction apparatus 1E are disposed in different acoustic spaces.

In the second microphone 12 disposed in the rear space 7*b*, a sound pressure in phase opposite to phase of a sound pressure emitted forward from the diaphragm 4*a* and noise entering through the housing 3 can be collected.

Thus, by generating the synthesized noise-cancelling signal Snc using the second sound collection signal S2 by the second microphone 12, it is possible to improve noise cancellation performance.

5. Fourth Embodiment

<5-1. Configuration of Acoustic Reproduction Apparatus>

Figure 11:
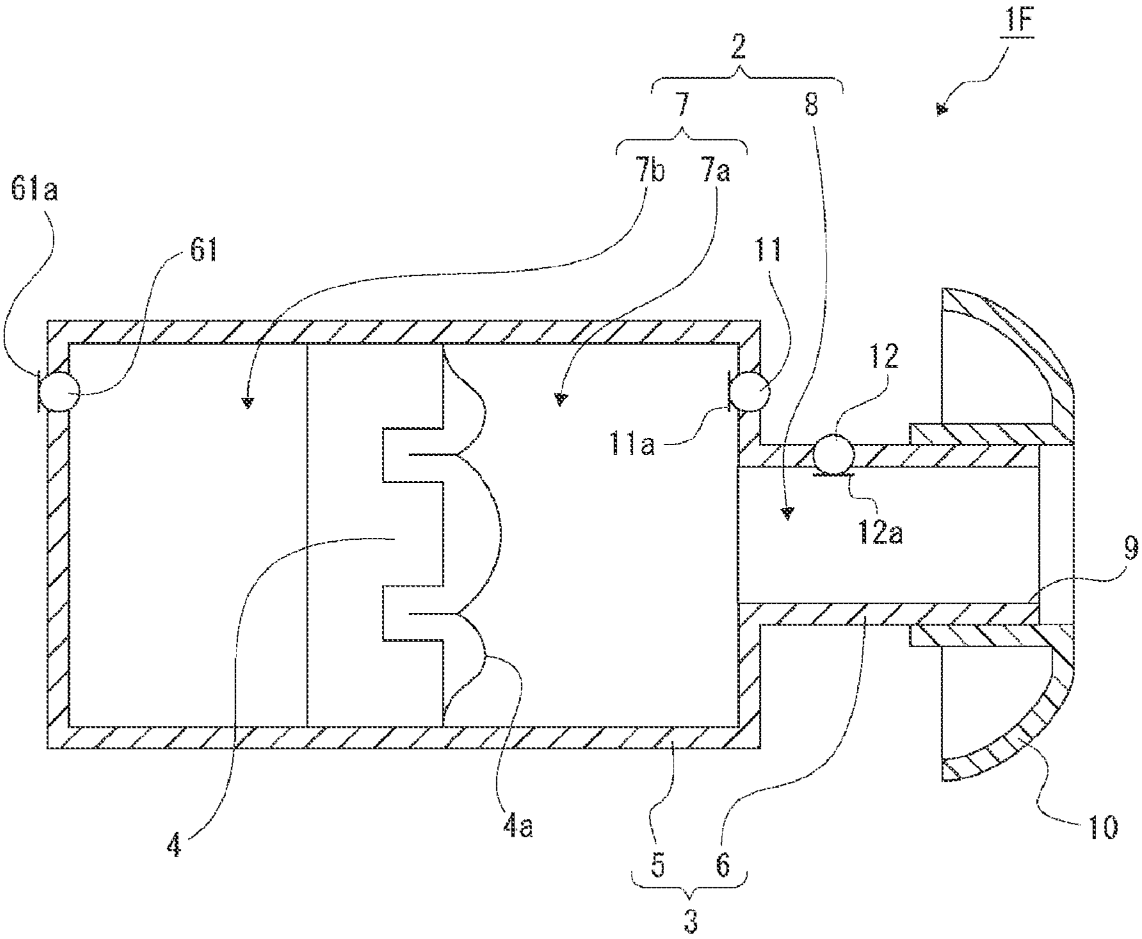
FIG. 11 is a view illustrating an earphone of a fourth embodiment.

FIG. 11 illustrates an acoustic reproduction apparatus 1F as an earphone in a fourth embodiment. The acoustic reproduction apparatus 1F according to the fourth embodiment includes a third microphone 61 for generating a feedforward noise-cancelling signal.

Specifically, a configuration of the acoustic reproduction apparatus 1F will be described with reference to FIG. 11.

The acoustic reproduction apparatus 1F includes the housing 3 in which the internal space 2 is formed, the driver unit 4 disposed in the internal space 2, the first microphone 11 and the second microphone 12 to be used for noise cancellation processing using the feedback scheme, and a third microphone 61 to be used for noise cancellation processing using a feedforward scheme.

The internal space 2 includes the arrangement space 7 in which each unit is disposed, and the sound guiding space 8 surrounded by the sound conduit 6.

The arrangement space 7 includes the front space 7*a* which is a space in front of the driver unit 4 and the rear space 7*b* which is a space behind the driver unit 4.

The first microphone 11 is disposed so that the sound collection surface 11*a* substantially faces the diaphragm 4*a* in the front space 7*a*.

The second microphone 12 is disposed in sound guiding space 8 so that the sound collection surface 12*a* faces a direction different from a direction of the sound collection surface 11*a* of the first microphone 11.

The third microphone 61 is attached to the housing 3 so that a sound collection surface 61*a* is positioned in an external space so as to be able to collect sound outside the acoustic reproduction apparatus 1F.

As a result, the feedback noise cancellation processing and the feedforward noise cancellation processing can be combined, so that noise cancellation performance can be improved.

Note that the acoustic resistance member 51 that separates the front space 7*a* from the sound guiding space 8 may be included by the acoustic reproduction apparatus 1F.

As a result, the front space 7*a* is an acoustically stable space surrounded by the box-shaped portion 5 of the housing 3, the driver unit 4, and the acoustic resistance member 51.

<5-2. Internal Configuration of Acoustic Reproduction Apparatus>

Figure 12:
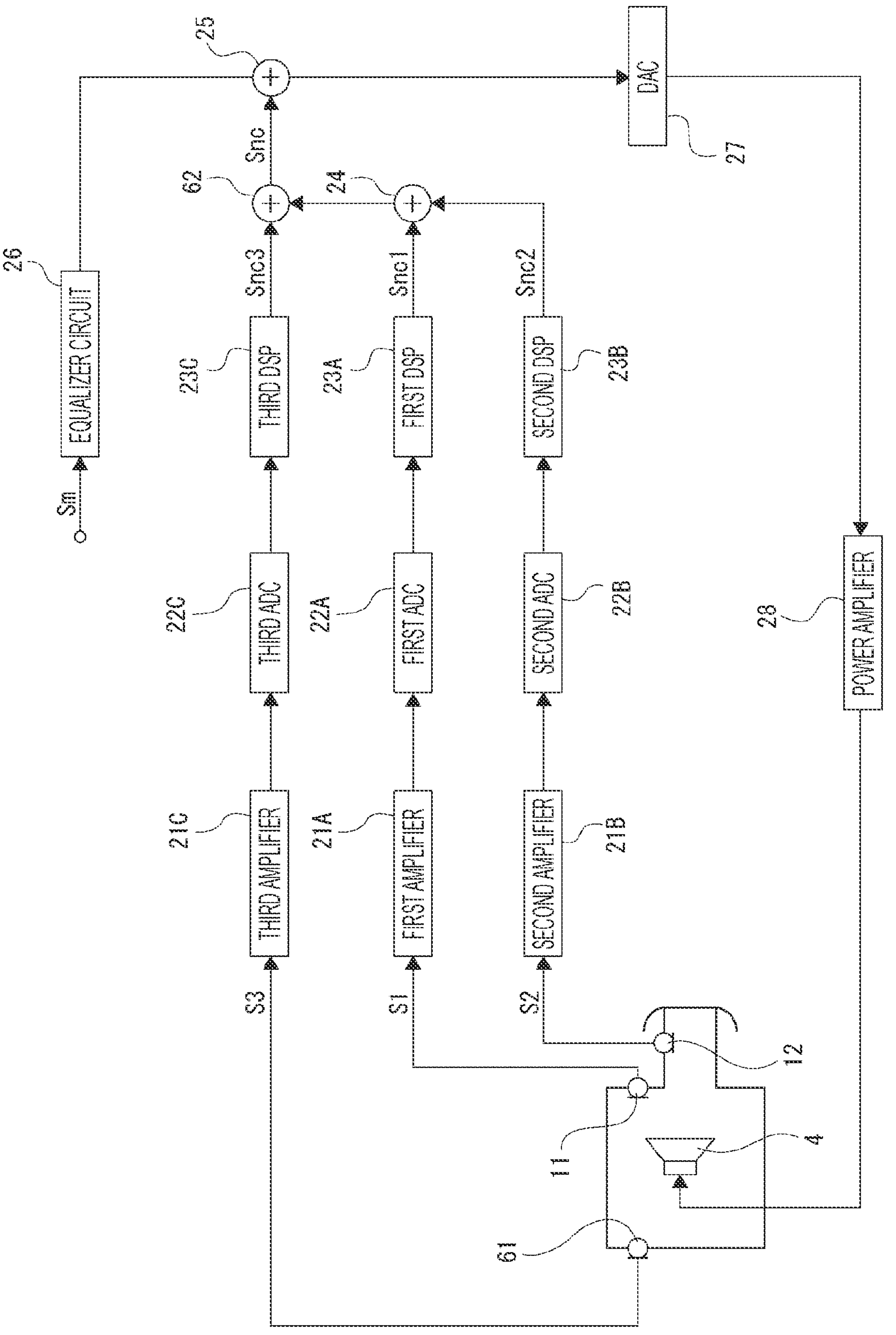
FIG. 12 is a block diagram of the acoustic reproduction apparatus according to the fourth embodiment.

FIG. 12 is a block diagram of an internal configuration of the acoustic reproduction apparatus 1F.

The acoustic reproduction apparatus 1F includes a first amplifier 21A, a first ADC 22A, and a first DSP 23A as units for performing processing on the first sound collection signal S1 of the first microphone 11.

Furthermore, the acoustic reproduction apparatus 1F includes a second amplifier 21B, a second ADC 22B, and a second DSP 23B as units for performing processing on the sound collection signal S2 of the second microphone 12.

Further, the acoustic reproduction apparatus 1 includes a third amplifier 21C, a third ADC 22C, and a third DSP 23C as units for performing processing on the sound collection signal S3 of the third microphone 61.

The acoustic reproduction apparatus 1F includes adders 24 and 25, an equalizer circuit 26, a DAC 27, and a power amplifier 28, and further includes an adder 62.

As described above, the first sound collection signal S1 is obtained by collecting sound including noise in the front space 7*a* of the diaphragm 4*a* of the driver unit 4.

The first sound collection signal S1 is amplified by the first amplifier 21A, converted into a digital signal by the first ADC 22A and input to the first DSP 23A.

The first DSP 23A includes a digital filter for generating a feedback noise-cancelling signal (see FIG. 4).

The signal generated by the first DSP 23A is input to the adder 24.

As described above, the second sound collection signal S2 is obtained by collecting sound including noise of the sound guiding space 8 which is the internal space of the sound conduit 6.

The second sound collection signal S2 is amplified by the second amplifier 21B, converted into a digital signal by the second ADC 22B and input to the second DSP 23B.

The second DSP 23B includes a digital filter for generating a feedback noise-cancelling signal (see FIG. 5).

The signal generated by the second DSP 23B is input to the adder 24.

The adder 24 adds and synthesizes the first noise-cancelling signal Snc1 generated on the basis of the first sound collection signal S1 of the first microphone 11 and the second noise-cancelling signal Snc2 generated on the basis of the second sound collection signal S2 of the second microphone 12 and outputs the result to the adder 62.

A third sound collection signal S3 is obtained by collecting sound including noise in the external space of the acoustic reproduction apparatus 1F.

The third sound collection signal S3 is amplified by the third amplifier 21C, converted into a digital signal by the third ADC 22C and input to the third DSP 23C.

Figure 13:
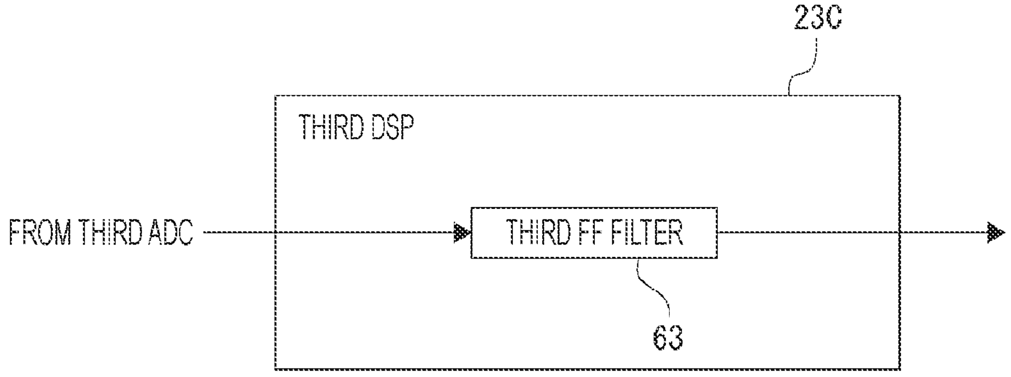
FIG. 13 is a block diagram of a third DSP of the fourth embodiment.

The third DSP 23C includes a digital filter for generating a feedforward noise-cancelling signal. Specifically, as illustrated in FIG. 13, a third FF filter 63 is provided.

The third FF filter 63 is a digital filter for generating a feedforward digital noise-cancelling signal. In other words, the third FF filter 63 generates a third noise-cancelling signal Snc3 on the basis of the third sound collection signal S3.

The third noise-cancelling signal Snc3 generated in the third DSP 23C is input to the adder 62.

The adder 62 adds and synthesizes a synthesized signal of the first noise-cancelling signal Snc1 generated on the basis of the first sound collection signal S1 of the first microphone 11 and the second noise-cancelling signal Snc2 generated on the basis of the second sound collection signal S2 of the second microphone 12, and the third noise-cancelling signal Snc3 generated on the basis of the third sound collection signal S3 of the third microphone 61, and outputs the result as a synthesized noise-cancelling signal Snc to the adder 25.

In addition to the synthesized noise-cancelling signal Snc, a digital signal based on the sound source signal Sm is also input to the adder 25.

The sound source signal Sm is input to the equalizer circuit 26.

The equalizer circuit 26 performs equalizing processing for sound quality correction processing and sound quality effect processing on the input sound source signal Sm and outputs the obtained digital signal to the adder 25.

The equalizer circuit 26 may be constituted within a DSP, for example.

The adder 25 adds and synthesizes the synthesized noise-cancelling signal Snc and the signal from the equalizer circuit 26 and outputs the result to the DAC 27 as an output acoustic signal.

The output signal from the adder 25 is converted into an analog signal by the DAC 27, then amplified by the power amplifier 28 and supplied to the driver unit 4.

In the driver unit 4, acoustic output processing based on the input output acoustic signal is executed. As a result, the listener listens to the reproduced sound with reduced noise at a predetermined noise cancellation point.

As illustrated in FIG. 11, the first microphone 11 is disposed so that the sound collection surface 11*a* faces the diaphragm 4*a* of the driver unit 4, and thus, the first noise-cancelling signal Snc1 can prevent occurrence of howling.

In addition, by using the second sound collection signal S2 by the second microphone 12 in which the sound collection surface 12*a* faces a direction different from a direction of the first microphone 11, it is possible to bring the cancellation point closer to the eardrum.

Furthermore, the sound collection surface 61*a* is constituted to pick up noise in the external space of the acoustic reproduction apparatus 1F, so that it is possible to perform noise cancellation processing using the feedforward scheme.

By using the third sound collection signal S3 by the third microphone 61, noise cancellation performance can be improved.

While FIG. 12 illustrates an example in which the first DSP 23A, the second DSP 23B, and the third DSP 23C are provided, a digital filter for the first sound collection signal S1, a digital filter for the second sound collection signal S2, and a digital filter for the third sound collection signal S3 may be formed in one DSP.

Furthermore, in this case, the equalizer circuit 26 may be formed in the same DSP.

Note that while FIG. 3 illustrates an example in which the sound source signal Sm is a digital signal, the sound source signal Sm may be an analog signal. In this case, the sound source signal Sm is converted into a digital signal using the ADC and input to the equalizer circuit 26.

Furthermore, the acoustic reproduction apparatus 1F as the fourth embodiment may be an acoustic reproduction apparatus as a headphone including the third microphone 61, in which case, a similar effect can be obtained.

6. Modifications

<6-1. First Modification>

In each of the above-described examples, an example has been described in which the digital filter for generating the noise-cancelling signal is provided for each of the first sound collection signal S1 and the second sound collection signal S2.

In other words, as described with reference to FIGS. 3, 4, and 5, in the acoustic reproduction apparatus 1, the first FB filter 32 is provided as a digital filter for generating the first noise-cancelling signal Snc1 using the first sound collection signal S1, and the second FB filter 34 is provided as a digital filter for generating the second noise-cancelling signal Snc2 using the second sound collection signal S2.

In order to reduce a calculation amount of the digital filter processing, only one digital filter for generating the synthesized noise-cancelling signal Snc may be provided.

Specifically, an internal configuration of an acoustic reproduction apparatus 1G provided with only one digital filter for generating the synthesized noise-cancelling signal Snc will be described with reference to FIG. 14.

The acoustic reproduction apparatus 1G includes a first amplifier 21A, a first ADC 22A, and an HPF 71 as units for performing processing on the first sound collection signal S1 of the first microphone 11. In other words, the acoustic reproduction apparatus 1G does not include the first DSP that performs digital filter processing on the first sound collection signal S1.

The first sound collection signal S1 is amplified by the first amplifier 21A, then converted into a digital signal by the first ADC 22A, and further, the low-frequency component is removed by the HPF 71 and input to the adder 73.

The acoustic reproduction apparatus 1G includes a second amplifier 21B, a second ADC 22B, and an LPF 72 as units for performing processing on the second sound collection signal S2 of the second microphone 12. In other words, the acoustic reproduction apparatus 1G does not include the second DSP that performs digital filter processing on the second sound collection signal S2.

The second sound collection signal S2 is amplified by the second amplifier 21B, then converted into a digital signal by the second ADC 22B, and further, the high-frequency component is removed by the LPF 72 and input to the adder 73.

The adder 73 adds and synthesizes the high-frequency component of the first sound collection signal S1 of the first microphone 11 and the low-frequency component of the second sound collection signal S2 of the second microphone 12 and outputs the result to the FB filter 74, which is a digital filter for generating a noise-cancelling signal.

The FB filter 74 performs digital filter processing for generating the noise-cancelling signal Snc' on the basis of the sound collection signal added and synthesized.

The generated noise-cancelling signal Snc' can be regarded as the synthesized noise-cancelling signal Snc described above.

The adder 25 adds and synthesizes the noise-cancelling signal Snc' and the signal from the equalizer circuit 26 and outputs the result to the DAC 27 as an output acoustic signal.

The DAC 27 converts the input signal from the adder 25 into an analog signal and outputs the analog signal to the power amplifier 28.

The power amplifier 28 amplifies the input signal and supplies the amplified signal to the driver unit 4.

In the driver unit 4, acoustic output processing based on the input output acoustic signal is executed.

Figure 14:
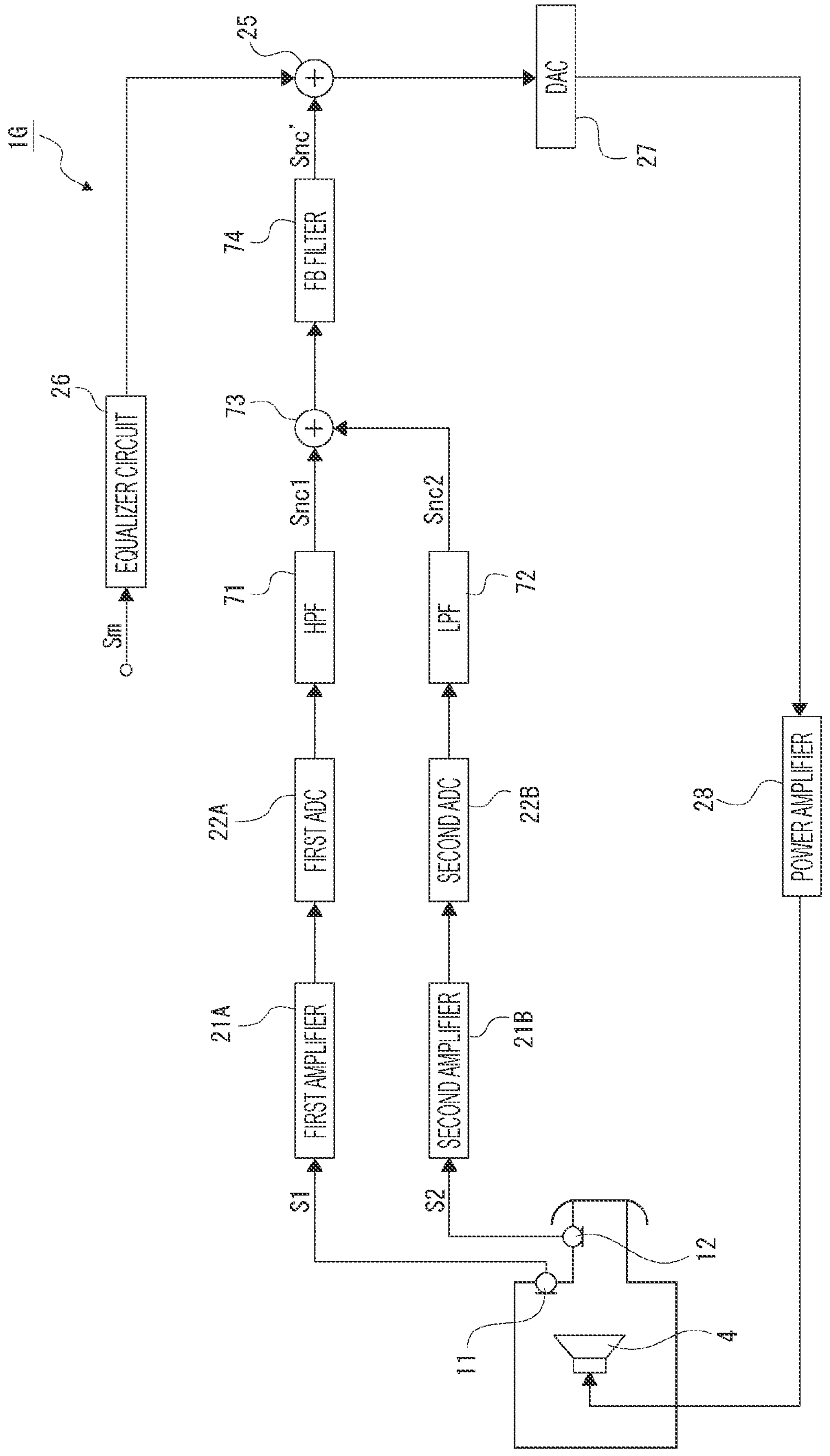
FIG. 14 is a block diagram of an acoustic reproduction apparatus of a first modification.

Note that the HPF 71 illustrated in FIG. 14 may be provided not at a subsequent stage but at a preceding stage of the first ADC 22. In other words, the filter processing may be performed on the analog signal.

Similarly, the LPF 72 may be provided at a preceding stage of the second ADC 22B.

Note that the HPF 71 can be replaced with a high-shelving filter, a high-peak EQ filter, or the like. In addition, the LPF 72 can be replaced with a low-shelving filter, a low-peak EQ filter, or the like.

Further, it is also possible to employ a configuration where the HPF 71 and the LPF 72 are not provided, and only the FB filter 74 is provided.

<6-2. Second Modification>

In the second embodiment, an example in which the acoustic resistance member 51 is provided in the acoustic reproduction apparatuses 1B and 10 has been described.

Here, an attachment mode of the acoustic resistance member 51 will be described by exemplifying a headphone type acoustic reproduction apparatus 10.

Figure 15:
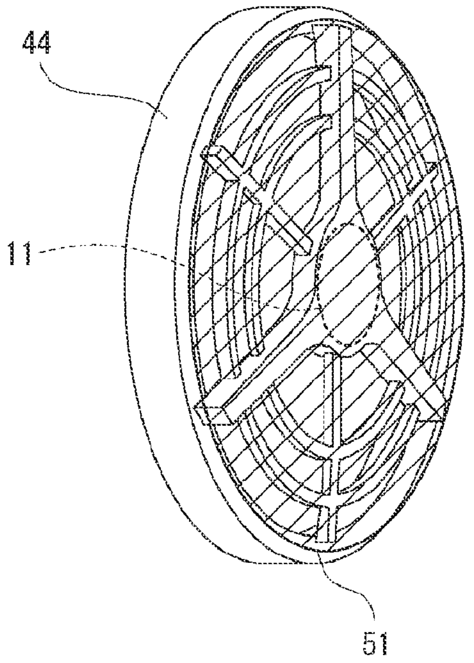
FIG. 15 is a view illustrating an example of attachment of an acoustic resistance member.

FIG. 15 illustrates a first example of attachment of the acoustic resistance member 51 to the protective member 44. The acoustic resistance member 51 (illustrated by hatching with oblique lines) may be attached over an entire front surface of the protective member 44.

As a result, a space in front of the acoustic resistance member 51 (for example, the outer space 53) and a space behind the acoustic resistance member 51 (for example, the inner space 52) can be acoustically divided. This can make the rear space acoustically more stable and can prevent occurrence of howling.

Figure 16:
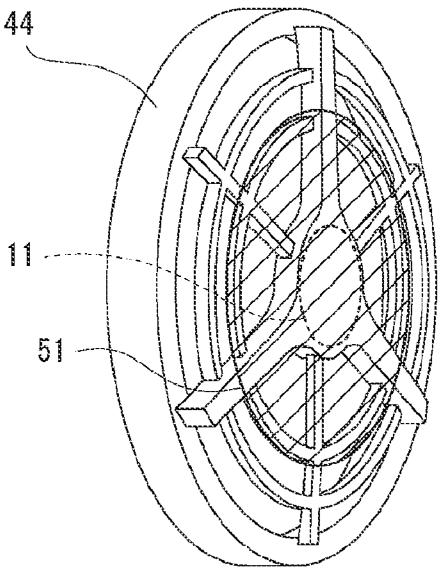
FIG. 16 is a view illustrating an example of attachment of an acoustic resistance member.

FIG. 16 illustrates a second example of attachment of the acoustic resistance member 51 to the protective member 44. The acoustic resistance member 51 (illustrated by hatching with oblique lines) may be attached from the front so as to cover a substantially central portion of the protective member 44.

In this case, it is preferable that the first microphone 11 is positioned at the center of the acoustic resistance member 51.

FIG. 17 illustrates a third example of attachment of the acoustic resistance member 51 to the protective member 44. The acoustic resistance member 51 (illustrated by hatching with oblique lines) may be attached from the front so as to cover an upper half region, a lower half region, a right half region, and a left half region of the protective member 44.

Further, in this case, it is preferable that the acoustic resistance member 51 is positioned so as to be offset to a portion covered by the acoustic resistance member 51 with respect to the central portion of the protective member 44.

FIG. 18 illustrates a fourth example of attachment of the acoustic resistance member 51 to the protective member 44. The acoustic resistance member 51 (illustrated by hatching with oblique lines) may be attached from the front so as to cover a central portion of the protective member 44 from the upper end to the lower end.

Further, in this case, it is preferable that the first microphone 11 is positioned at the center of the acoustic resistance member 51.

In addition to the configuration in which the acoustic resistance member 51 is attached over the entire surface of the protective member 44 as illustrated in FIG. 15, even with the configuration as illustrated in FIGS. 16, 17, and 18, the rear space can be made an acoustically stable space, so that an effect of preventing occurrence of howling can be obtained.

<6-3. Others>

Note that, in each of the above-described examples, a headphone and an earphone are taken as examples of the acoustic reproduction apparatus, but other examples are also conceivable. For example, the above-described configuration can also be applied to a noise-cancelling signal generated for performing noise cancellation processing in a space having a certain size such as a room.

In other words, the first MC and the second MC to be used for FB control are provided in the room. In this case, the second MC is disposed so as to be closer to a window or a door than the first MC.

Further, a third MC to be used for FF control may be provided outside the room.

In this manner, in a case where the listener listens to music, or the like, in the room as an acoustic space, it is possible to provide a space with reduced noise, which is appropriate for listening.

7. Conclusion

The acoustic reproduction apparatus 1 (1A, 1B, 1C, 1D, 1E, and 1G) such as a headphone or an earphone described above includes a first microphone 11 to be used for noise cancellation processing using a feedback scheme, a second microphone 12 including a sound collection surface in a direction different from a direction of a sound collection surface of the first microphone 11 and to be used for noise cancellation processing using the feedback scheme, and an acoustic signal processing unit (the first DSP 23A, the second DSP 23B, and the like) configured to generate a noise-cancelling signal (using a first sound collection signal S1 collected by the first microphone 11 and a second sound collection signal S2 collected by the second microphone 12.

In a configuration including a plurality of microphones to be used for the noise cancellation processing using the feedback scheme, it is easy to collect sound in a plurality of acoustic spaces (for example, the front space 7*a* of the driver unit 4 and the space in the sound conduit (sound guiding space 8)) in the acoustic reproduction apparatus 1.

Use of a plurality of microphones to be used in the feedback scheme can contribute to improvement of a noise cancellation effect. Further, by changing a sound collection direction of each microphone, it is possible to appropriately collect acoustic signals including noise in a plurality of spaces, which is suitable for improvement of the noise cancellation effect using the feedback scheme.

As described in the first embodiment (FIG. 2), in the acoustic reproduction apparatus 1, the sound collection surface 11*a* of the first microphone 11 may be positioned closer to a driver unit 4 configured to perform acoustic output on the basis of the noise-cancelling signal than the sound collection surface 12*a* of the second microphone 12.

This makes the transfer function of the space from the driver unit 4 to the sound collection surface 11*a* of the first microphone 11 to be less likely to change.

It is therefore possible to generate the first noise-cancelling signal Snc1 having sufficient noise cancellation performance with the filter coefficient set in the first FB filter 32. In other words, the noise cancellation performance can be improved by adding the first noise-cancelling signal Snc1 generated by the sound collection signal of the first microphone 11.

As described in the first embodiment (FIG. 2), in the acoustic reproduction apparatus 1, the sound collection surface 11*a* of the first microphone 11 may be positioned to face a sound emission direction (front) of a driver unit 4 configured to perform acoustic output on the basis of the noise-cancelling signal.

This makes the transfer function of the space from the driver unit 4 to the sound collection surface 11*a* of the first microphone 11 to be less likely to change.

It is therefore possible to generate the first noise-cancelling signal Snc1 having sufficient noise cancellation performance with the filter coefficient set in the first FB filter 32. In other words, the noise cancellation performance can be improved by adding the first noise-cancelling signal Snc1 generated by the sound collection signal of the first microphone 11.

As described in the first embodiment (FIG. 2), the acoustic reproduction apparatus 1 may further include a housing 3 in which a driver unit 4 configured to perform acoustic output on the basis of the noise-cancelling signal is disposed and which has a sound emission port 9 through which output sound from the driver unit 4 is emitted, and the first microphone 11 and the second microphone 12 may be disposed in the housing 3, and the second microphone 12 may be positioned closer to the sound emission port 9 than the first microphone 11.

As a result, the second microphone 12 can collect sound at a position closer to an eardrum of an ear than the first microphone 11.

This can bring the cancellation point closer to the eardrum of the ear, so that the noise cancellation performance can be improved.

As described in the first embodiment (FIGS. 2 and 6), the second embodiment (FIGS. 7 and 8), the third embodiment (FIGS. 9 and 10), and the fourth embodiment (FIG. 11), or the like, in the acoustic reproduction apparatus 1, the sound collection surface 12*a* of the second microphone 12 may be positioned not to face a sound emission direction (front) of a driver unit 4 configured to perform acoustic output on the basis of the noise-cancelling signal.

This makes it easier for the second microphone 12 to collect noise.

It is therefore possible to improve noise cancellation performance.

As described in the first embodiment (FIG. 6), in the acoustic reproduction apparatus 1, at least one acoustic space may be positioned in the housing 3 in a sound emission direction of the driver unit 4, and the first microphone 11 and the second microphone 12 may be positioned in the one acoustic space.

As a result, a noise component in the acoustic space in which the microphone is disposed can be collected with high accuracy.

This enables more appropriate settings of the filter coefficient, so that noise cancellation performance can be improved.

In addition, it is not necessary to provide members, or the like, for dividing the acoustic space into a plurality of spaces. This can reduce cost related to manufacturing. In addition, the number of parts is reduced, so that the number of assembling steps can be reduced.

As described in the first embodiment (FIG. 6), the second embodiment (FIG. 8), and the third embodiment (FIG. 10), or the like, in the acoustic reproduction apparatus 1, the first microphone 11 may be positioned so that the sound collection surface 11*a* faces a sound emission direction of the driver unit 4, and the second microphone 12 may be positioned so that the sound collection surface 12*a* faces the same direction as the sound emission direction of the driver unit 4.

As a result, the transfer function of the space from the driver unit 4 to the sound collection surface 11*a* of the first microphone 11 is less likely to change. In addition, the second microphone 12 easily collects noise at a position closer to the eardrum.

Thus, by generating the noise-cancelling signal using both the first sound collection signal S1 of the first microphone 11 and the second sound collection signal S2 of the second microphone 12, it is possible to improve noise cancellation performance while preventing occurrence of howling.

As described in the first embodiment (FIG. 2), the second embodiment (FIGS. 7 and 8), the third embodiment (FIG. 9, FIG. 10), or the like, in the acoustic reproduction apparatus 1, the first microphone 11 and the second microphone 12 may be disposed in different acoustic spaces.

This makes noise collected by the first microphone 11 different from noise collected by the second microphone 12.

Thus, by generating the noise-cancelling signal on the basis of both the first sound collection signal S1 of the first microphone 11 and the second sound collection signal S2 of the second microphone 12, it is possible to improve noise cancellation performance.

As described in the first embodiment (FIG. 2), the second embodiment (FIGS. 7 and 8), the third embodiment (FIG. 9, FIG. 10), or the like, in the acoustic reproduction apparatus 1, a plurality of acoustic spaces may be provided in the housing 3, and the first microphone 11 and the second microphone 12 may be positioned in different spaces in the plurality of acoustic spaces.

By this means, both the first microphone 11 and the second microphone 12 are disposed in the housing 3. Furthermore, the noise collected by the first microphone 11 and the noise collected by the second microphone 12 become more different from each other.

Thus, sound collection signals at different positions in the housing can be obtained, so that noise cancellation performance can be improved.

As described in the second embodiment (FIGS. 7 and 8), or the like, in the acoustic reproduction apparatus 1, an acoustic resistance member 51 that separates a first acoustic space (the front space 7*a*, the inner space 52) in which the first microphone 11 is positioned from a second acoustic space (sound guiding space 8) in which the second microphone 12 is positioned, may be disposed.

This can achieve a stable space in which the transfer function of the space from the driver unit 4 to the microphone (the first microphone 11) is less likely to change for one acoustic space (the front space 7*a*).

Thus, a high noise cancellation effect can be obtained using the set filter coefficient.

As described in the second embodiment (FIGS. 7 and 8), or the like, the acoustic reproduction apparatus 1 may further include a housing 3 in which a driver unit 4 configured to perform acoustic output on the basis of the noise-cancelling signal is disposed and which has a sound emission port 9 through which output sound from the driver unit 4 is emitted, and the first acoustic space (the front space 7*a*) may be a space surrounded by the driver unit 4, the acoustic resistance member 51, and the housing 3, and the second acoustic space (sound guiding space 8) may be a space surrounded by the acoustic resistance member 51, the housing 3, and the sound emission port 9.

As a result, the first acoustic space becomes a stable space in which the transfer function of the space is less likely to change. In addition, the second acoustic space becomes a space in which noise at a position closer to the eardrum is easily collected.

By generating the first noise-cancelling signal Snc1 using the first sound collection signal S1 of the first microphone 11 disposed in the first sound space (the front space 7*a* in FIG. 2, the inner space 52 in FIG. 8, or the like) that is an acoustically stable space, the filter coefficient set for the first FB filter 32 can be made appropriate with high noise cancellation performance.

In addition, there is a case where an acoustic reproduction apparatus such as an earphone and a headphone is deformed depending on a use state. In this case, a spatial transfer function changes, so that the set filter coefficient becomes inappropriate, which may cause howling, or the like. Even in such a case, an acoustically stable state is maintained by shielding the first acoustic space from outside by the acoustic resistance member 51, so that appropriate settings of the filter coefficient is secured, which can prevent occurrence of howling.

However, there is a case where the microphone (first microphone 11) disposed in the stable space cannot sufficiently collect noise in the vicinity of a point where the noise cancellation effect is desired (that is, in the vicinity of the eardrum). In a case where noise cannot be sufficiently collected, the generated noise-cancelling signal is not appropriate, and there is a case where an active noise cancellation effect at the eardrum position is reduced.

According to the present configuration, the second noise-cancelling signal Snc2 is generated using the second sound collection signal S2 of the second microphone 12 disposed in the second acoustic space (the sound guiding space 8 in FIG. 2, the outer space 53 in FIG. 8, or the like) different from the first acoustic space, so that it is possible to exhibit high noise cancellation performance while preventing howling.

As described in the third embodiment (FIGS. 9 and 10), or the like, in the acoustic reproduction apparatus 1, the first microphone 11 may be positioned on a front side which is a sound emission direction of a driver unit 4 that performs acoustic output on the basis of the noise-cancelling signal, and the second microphone 12 may be positioned on a rear side of the driver unit 4.

As a result, for example, the second microphone 12 positioned behind the driver unit 4 can collect sound in phase opposite to phase of the acoustic output. Furthermore, in the second microphone 12, the transfer function of the space from the driver unit 4 to the sound collection surface 12*a* of the second microphone 12 is made less likely to change depending on a wearing state of the listener.

In this event, the second microphone 12 also collects noise that has not been completely removed by the noise-cancelling signal generated on the basis of the first sound collection signal S1 of the first microphone 11.

Thus, by generating the noise-cancelling signal on the basis of not only the first sound collection signal S1 of the first microphone 11 but also the second sound collection signal S2 of the second microphone 12, high noise cancellation performance can be exhibited.

As described in the first embodiment (FIGS. 4 and 5), the acoustic reproduction apparatus 1 may further include a first feedback filter (the first FB filter 32) configured to generate a first noise-cancelling signal Snc1 on the basis of a high-frequency component of the first sound collection signal S1, and a second feedback filter (the second FB filter 34) configured to generate a second noise-cancelling signal Snc2 on the basis of a low-frequency component of the second sound collection signal S2, and the acoustic signal processing unit may generate the noise-cancelling signal on the basis of the first noise-cancelling signal Snc1 and the second noise-cancelling signal Snc2.

The first microphone 11 is disposed closer to the driver unit 4 than the second microphone 12, and thus, the filter coefficient set for the first FB filter 32 is less likely to be inappropriate than the filter coefficient set for the second FB filter 34. This can make the first noise-cancelling signal Snc1 based on the first sound collection signal S1 less likely to cause howling than the second noise-cancelling signal Snc2 based on the second sound collection signal S2.

Thus, for a high-frequency component in which howling is likely to occur, the first noise-cancelling signal Snc1 in which howling is less likely to occur is generated by using the first sound collection signal S1, and for a low-frequency component in which howling is less likely to occur, the second noise-cancelling signal Snc2 with improved noise cancellation performance is generated by using the second sound collection signal S2. By generating the noise-cancelling signal using these, it is possible to improve noise cancellation performance while preventing occurrence of howling.

As described in the first embodiment (FIGS. 4 and 5), in the acoustic reproduction apparatus 1, a high-frequency component of the first sound collection signal S1 may be extracted by a high-pass filter HPF 31, a high-shelving filter, or a high-peak EQ filter, and a low-frequency component of the second sound collection signal S2 may be extracted by a low-pass filter LPF 33, a low-shelving filter, or a low-peak EQ filter.

As a result, it is possible to input a sound collection signal of a high-frequency component that is more likely to howl to a feedback loop of the first microphone 11 in which the transfer function of the space from the driver unit 4 to the microphone is less likely to change. In addition, it is possible to input a sound collection signal of a low-frequency component to a feedback loop of the second microphone 12 that easily collects noise at a position closer to the eardrum.

It is therefore possible to prevent occurrence of howling. Furthermore, noise cancellation performance based on the second sound collection signal S2 can be improved by removing a low-frequency component of the first sound collection signal S1.

As described in the fourth embodiment (FIG. 11), or the like, the acoustic reproduction apparatus 1 may further include a third microphone 61 to be used for noise cancellation processing using a feedforward scheme, and the acoustic signal processing unit (the first DSP 23A, the second DSP 23B, the third FF filter 63, and the like) may generate the noise-cancelling signal by using the first sound collection signal S1, the second sound collection signal S2, and a third sound collection signal S3 collected by the third microphone 61.

For example, it is conceivable to provide a third microphone 61 so as to collect sound outside the acoustic reproduction apparatus 1F.

By using the third sound collection signal S3 by the third microphone 61 described here, noise cancellation performance can be improved.

As shown in the various embodiments described above, a signal processing apparatus includes an acoustic signal processing unit (the first DSP 23A, the second DSP 23B, and the like) configured to generate a noise-cancelling signal using a first sound collection signal S1 collected by a first microphone 11 to be used for noise cancellation processing using a feedback scheme and a second sound collection signal S2 collected by a second microphone 12 including a sound collection surface in a direction different from a direction of a sound collection surface of the first microphone 11 and to be used for noise cancellation processing using the feedback scheme.

In addition, a signal processing method that the signal processing apparatus executes is a method including generating a noise-cancelling signal using a first sound collection signal S1 collected by a first microphone 11 to be used for noise cancellation processing using a feedback scheme and a second sound collection signal S2 collected by a second microphone 12 including a sound collection surface in a direction different from a direction of a sound collection surface of the first microphone 11 and to be used for noise cancellation processing using the feedback scheme.

According to such a signal processing apparatus and a signal processing method, it is easy to set a state in which sound collection is performed in a plurality of acoustic spaces (for example, the front space 7*a* of the driver unit 4 and the space in the sound conduit (sound guiding space 8)) in the acoustic reproduction apparatus 1, so that it is possible to contribute to improvement of the noise cancellation effect by using a plurality of microphones to be used for the feedback scheme. In addition, it is possible to appropriately collect sound of an acoustic signal including noise in a plurality of spaces by changing a sound collection direction of each microphone. This can improve the noise cancellation effect by the feedback scheme.

Further, the advantageous effects described in the present specification are merely examples and are not limitative, and other advantageous effects may be achieved.

In addition, the above-described examples can be combined in any manner as long as the combination is possible.

8. Present Technology

Note that the headphone apparatus of the present technology can also adopt the following configuration.

(1)

An acoustic reproduction apparatus including:

a first microphone to be used for noise cancellation processing using a feedback scheme;

a second microphone including a sound collection surface in a direction different from a direction of a sound collection surface of the first microphone and to be used for noise cancellation processing using the feedback scheme; and an acoustic signal processing unit configured to generate a noise-cancelling signal using a first sound collection signal collected by the first microphone and a second sound collection signal collected by the second microphone.

(2)

The acoustic reproduction apparatus according to (1), in which the sound collection surface of the first microphone is positioned closer to a driver unit configured to perform acoustic output on the basis of the noise-cancelling signal than the sound collection surface of the second microphone.

(3)

The acoustic reproduction apparatus according to any one of (1) to (2), in which the sound collection surface of the first microphone is positioned to face a sound emission direction of a driver unit configured to perform acoustic output on the basis of the noise-cancelling signal.

(4)

The acoustic reproduction apparatus according to any one of (1) to (3), further including:

a housing in which a driver unit configured to perform acoustic output on the basis of the noise-cancelling signal is disposed and which has a sound emission port through which output sound from the driver unit is emitted, in which the first microphone and the second microphone are disposed in the housing, and the second microphone is positioned closer to the sound emission port than the first microphone.

(5)

The acoustic reproduction apparatus according to any one of (1) to (4), in which the sound collection surface of the second microphone is positioned so as not to face a sound emission direction of a driver unit configured to perform acoustic output on the basis of the noise-cancelling signal.

(6)

The acoustic reproduction apparatus according to (4), in which at least one acoustic space is positioned in the housing in a sound emission direction of the driver unit, and the first microphone and the second microphone are positioned in the one acoustic space.

(7)

The acoustic reproduction apparatus according to (6), in which the first microphone is positioned so that the sound collection surface faces a sound emission direction of the driver unit, and the second microphone is positioned so that the sound collection surface faces the same direction as the sound emission direction of the driver unit.

(8)

The acoustic reproduction apparatus according to any one of (1) to (5), in which the first microphone and the second microphone are disposed in different acoustic spaces.

(9)

The acoustic reproduction apparatus according to (4) or (6), in which a plurality of acoustic spaces is provided in the housing, and the first microphone and the second microphone are positioned in different spaces in the plurality of acoustic spaces.

(10)

The acoustic reproduction apparatus according to (8), in which an acoustic resistance member that separates a first acoustic space in which the first microphone is positioned from a second acoustic space in which the second microphone is positioned, is disposed.

(11)

The acoustic reproduction apparatus according to (10), further including:

a housing in which a driver unit configured to perform acoustic output on the basis of the noise-cancelling signal is disposed and which has a sound emission port through which output sound from the driver unit is emitted, in which the first acoustic space is a space surrounded by the driver unit, the acoustic resistance member, and the housing, and the second acoustic space is a space surrounded by the acoustic resistance member, the housing, and the sound emission port.

(12)

The acoustic reproduction apparatus according to any one of (1) to (11), in which the first microphone is positioned on a front side which is a sound emission direction of a driver unit that performs acoustic output on the basis of the noise-cancelling signal, and the second microphone is positioned on a rear side of the driver unit.

(13)

The acoustic reproduction apparatus according to (2), further including:

a first feedback filter configured to generate a first noise-cancelling signal on the basis of a high-frequency component of the first sound collection signal; and a second feedback filter configured to generate a second noise-cancelling signal on the basis of a low-frequency component of the second sound collection signal, in which the acoustic signal processing unit generates the noise-cancelling signal on the basis of the first noise-cancelling signal and the second noise-cancelling signal.

(14)

The acoustic reproduction apparatus according to (13), in which a high-frequency component of the first sound collection signal is extracted by a high-pass filter, a high-shelving filter, or a high-peak EQ filter, and a low-frequency component of the second sound collection signal is extracted by a low-pass filter, a low-shelving filter, or a low-peak EQ filter.

(15)

The acoustic reproduction apparatus according to any one of (1) to (14), further comprising:

a third microphone to be used for noise cancellation processing using a feedforward scheme, in which the acoustic signal processing unit generates the noise-cancelling signal by using the first sound collection signal, the second sound collection signal, and a third sound collection signal collected by the third microphone.

(16)

A signal processing apparatus including:

an acoustic signal processing unit configured to generate a noise-cancelling signal using a first sound collection signal collected by a first microphone to be used for noise cancellation processing using a feedback scheme and a second sound collection signal collected by a second microphone including a sound collection surface in a direction different from a direction of a sound collection surface of the first microphone and to be used for noise cancellation processing using the feedback scheme.

(17)

A signal processing method including:

generating a noise-cancelling signal using a first sound collection signal collected by a first microphone to be used for noise cancellation processing using a feedback scheme and a second sound collection signal collected by a second microphone including a sound collection surface in a direction different from a direction of a sound collection surface of the first microphone and to be used for noise cancellation processing using the feedback scheme.

REFERENCE SIGNS LIST

1, 1A, 1B, 1C, 1D, 1E, 1F Acoustic reproduction apparatus
3 Housing
4 Driver unit
7*a* Front space (first acoustic space)
8 Sound guiding space (second acoustic space)
9 Sound emission port
11 First microphone
11*a* Sound collection surface
12 Second microphone
12*a* Sound collection surface
23A First DSP (acoustic signal processing unit)
23B Second DSP (acoustic signal processing unit)
31 HPF
32 First FB filter
33 LPF
34 Second FB filter
51 Acoustic resistance member
52 Inner space (first acoustic space)
61 Third microphone
63 Third FF filter
71 HPF
72 LPF
S1 First sound collection signal
S2 Second sound collection signal
S3 Third sound collection signal
Snc1 First noise-cancelling signal
Snc2 Second noise-cancelling signal
Snc Synthesized noise-cancelling signal

The invention claimed is:

1. An acoustic reproduction apparatus, comprising:
a first microphone and a second microphone, wherein
each of the first microphone and the second microphone is associated with execution of a first noise cancellation process based on a feedback scheme,
the first microphone includes a first sound collection surface configured to collect a first sound collection signal,
the second microphone includes a second sound collection surface configured to collect a second sound collection signal, and
the second sound collection surface is in a first direction different from a second direction of the first sound collection surface;
a first feedback filter configured to generate a first noise-cancelling signal based on a high-frequency component of the first sound collection signal;
a second feedback filter configured to generate a second noise-cancelling signal based on a low-frequency component of the second sound collection signal; and
an acoustic signal processing unit configured to generate a noise-cancelling signal based on the first noise-cancelling signal and the second noise-cancelling signal.

2. The acoustic reproduction apparatus according to claim 1, further comprising a driver unit, wherein
the first sound collection surface is closer to the driver unit than the second sound collection surface, and
the driver unit is configured to perform acoustic output based on the noise-cancelling signal.

3. The acoustic reproduction apparatus according to claim 1, further comprising a driver unit, wherein
the first sound collection surface faces a sound emission direction of the driver unit, and
the driver unit is configured to perform acoustic output based on the noise-cancelling signal.

4. The acoustic reproduction apparatus according to claim 1, further comprising:
a housing that includes:
a driver unit configured to perform acoustic output based on the noise-cancelling signal, and
a sound emission port configured to emit output sound from the driver unit, wherein
the first microphone and the second microphone are in the housing, and
the second microphone is closer to the sound emission port than the first microphone.

5. The acoustic reproduction apparatus according to claim 4, wherein
the housing includes a plurality of acoustic spaces, and
the first microphone and the second microphone are in different acoustic spaces from the plurality of acoustic spaces.

6. The acoustic reproduction apparatus according to claim 1, further comprising a driver unit, wherein
the second sound collection surface faces the first direction different from a sound emission direction of the driver unit, and
the driver unit is configured to perform acoustic output based on the noise-cancelling signal.

7. The acoustic reproduction apparatus according to claim 4, wherein
the housing includes at least one acoustic space in a sound emission direction of the driver unit, and
the first microphone and the second microphone are in the at least one acoustic space.

8. The acoustic reproduction apparatus according to claim 7, wherein
the first sound collection surface faces in the second direction opposite to the sound emission direction of the driver unit based on a position of the first microphone, and
the second sound collection surface faces in the first direction same as the sound emission direction of the driver unit based on a position of the second microphone.

9. The acoustic reproduction apparatus according to claim 1, wherein the first microphone and the second microphone are in different acoustic spaces.

10. The acoustic reproduction apparatus according to claim 9, further comprising:
an acoustic resistance member configured to separate a first acoustic space from a second acoustic space, wherein
the different acoustic spaces include the first acoustic space and the second acoustic space,
the first microphone is in the first acoustic space, and
the second microphone is in the second acoustic space.

11. The acoustic reproduction apparatus according to claim 10, further comprising:
a housing that includes:
a driver unit configured to perform acoustic output based on the noise-cancelling signal, and
a sound emission port configured to emit output sound from the driver unit, wherein
each of the driver unit, the acoustic resistance member, and the housing surrounds the first acoustic space, and
each of the acoustic resistance member, the housing, and the sound emission port surrounds the second acoustic space.

12. The acoustic reproduction apparatus according to claim 1, further comprising a driver unit, wherein
the first microphone is on a front side of the driver unit,
the driver unit is configured to perform acoustic output based on the noise-cancelling signal,
the front side is a sound emission direction of the driver unit, and
the second microphone is on a rear side of the driver unit.

13. The acoustic reproduction apparatus according to claim 1, further comprising:
one of a high-pass filter, a high-shelving filter, or a high-peak EQ filter to extract the high-frequency component of the first sound collection signal, and
one of a low-pass filter, a low-shelving filter, or a low-peak EQ filter to extract the low-frequency component of the second sound collection signal.

14. The acoustic reproduction apparatus according to claim 1, further comprising:
a third microphone associated with a second noise cancellation process based on a feedforward scheme, wherein
the second noise cancellation process is different from the first noise cancellation process,
the third microphone is configured to collect a third sound collection signal, and
the acoustic signal processing unit is further configured to generate the noise-cancelling signal based on the first sound collection signal, the second sound collection signal, and the third sound collection signal.

15. A signal processing apparatus, comprising:
a first microphone and a second microphone, wherein
each of the first microphone and the second microphone is associated with execution of a noise cancellation process based on a feedback scheme,
the first microphone includes a first sound collection surface configured to collect a first sound collection signal,
the second microphone includes a second sound collection surface configured to collect a second sound collection signal, and
the second sound collection surface is in a first direction different from a second direction of the first sound collection surface;
a first feedback filter configured to generate a first noise-cancelling signal based on a high-frequency component of the first sound collection signal;
a second feedback filter configured to generate a second noise-cancelling signal based on a low-frequency component of the second sound collection signal; and
an acoustic signal processing unit configured to generate a noise-cancelling signal based on the first noise-cancelling signal and the second noise-cancelling signal.

16. A signal processing method, comprising:
in an acoustic reproduction apparatus:
collecting a first sound collection signal from a first sound collection surface of a first microphone;
collecting a second sound collection signal from a second sound collection surface of a second microphone, wherein
the second sound collection surface is in a first direction different from a second direction of the first sound collection surface, and
each of the first microphone and the second microphone is associated with execution of a noise cancellation process based on a feedback scheme;
generating, by a first feedback filter, a first noise-cancelling signal based on a high-frequency component of the first sound collection signal;
generating, by a second feedback filter, a second noise-cancelling signal based on a low-frequency component of the second sound collection signal; and
generating a noise-cancelling signal based on the first noise-cancelling signal and the second noise-cancelling signal.

* * * * *